(12) United States Patent
Murade

(10) Patent No.: US 7,202,927 B2
(45) Date of Patent: Apr. 10, 2007

(54) ELECTROOPTIC DEVICE COMPRISING A SILICON NITRIDE FILM FORMED DIRECTLY ON THE DATA LINES AND NOT EXISTENT ON A SIDE FACE OF CONTACT HOLES

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/259,766

(22) Filed: Sep. 30, 2002

(65) Prior Publication Data

US 2003/0076460 A1    Apr. 24, 2003

(30) Foreign Application Priority Data

Oct. 4, 2001 (JP) .............................. 2001-309102
Sep. 10, 2002 (JP) .............................. 2002-264520

(51) Int. Cl.
   G02F 1/1333     (2006.01)
   G02F 1/136      (2006.01)
(52) U.S. Cl. ........................................ 349/138; 349/43
(58) Field of Classification Search ................ 349/151, 349/122, 138, 129, 117, 119, 147
   See application file for complete search history.

(56) References Cited

U.S. PATENT DOCUMENTS 5,185,601 A * 2/1993 Takeda et al. ................. 349/39
5,245,452 A * 9/1993 Nakamura et al. ........... 349/140
5,250,931 A * 10/1993 Misawa et al. ............. 345/206
5,523,865 A * 6/1996 Furuta et al. ................. 349/42
5,721,596 A * 2/1998 Kochi ........................... 349/42
5,757,054 A * 5/1998 Miyawaki et al. .......... 257/390
5,886,761 A * 3/1999 Sasaki et al. ................ 349/122
5,926,702 A * 7/1999 Kwon et al. ................. 438/158
5,929,948 A * 7/1999 Ohori et al. .................. 349/44
6,011,274 A * 1/2000 Gu et al. ....................... 257/59
6,046,132 A * 4/2000 Mochizuki et al. ......... 503/227
6,051,466 A * 4/2000 Iwasa .......................... 438/259
6,121,632 A    9/2000 Taguchi et al.
6,144,427 A * 11/2000 Hoshi et al. ................. 349/105
6,160,600 A * 12/2000 Yamazaki et al. .......... 349/138
6,175,395 B1 * 1/2001 Yamazaki et al. ............ 349/44
6,243,146 B1 * 6/2001 Rho et al. ..................... 349/42

(Continued)

FOREIGN PATENT DOCUMENTS

JP     A-64-68725    3/1989

(Continued)

Primary Examiner—David Nelms
Assistant Examiner—W. Patty Chen
(74) Attorney, Agent, or Firm—Oliff & Berridge, PLC

(57) ABSTRACT

On a TFT array substrate, an electrooptic device contains pixel electrodes disposed in an image display region, TFTs which are disposed in a peripheral region at the periphery of the image display region and which form a peripheral circuit, and a protective film formed so as to cover at least a part of the peripheral region. The protective film is not provided in at least a part of an opening region of each pixel formed in the image display region. Accordingly, in the electrooptic device, such as a liquid crystal device, while the device life is increased by protecting electronic elements, such as transistors formed on the substrate by the protective film, degradation of display image quality caused by the presence of the protective film is reduced or prevented.

1 Claim, 14 Drawing Sheets

U.S. PATENT DOCUMENTS

| | | | |
|---|---|---|---|
| 6,271,897 B1 * | 8/2001 | Ichikawa et al. | 349/43 |
| 6,313,900 B1 | 11/2001 | Kawata | 349/153 |
| 6,362,030 B1 * | 3/2002 | Nagayama et al. | 438/151 |
| 6,411,349 B2 * | 6/2002 | Nakazawa et al. | 349/42 |
| 6,466,279 B1 * | 10/2002 | Nakata | 349/42 |
| 6,492,659 B1 * | 12/2002 | Yamazaki et al. | 257/59 |
| 6,531,713 B1 * | 3/2003 | Yamazaki | 257/59 |
| 2002/0057397 A1 * | 5/2002 | Ino | 349/59 |

FOREIGN PATENT DOCUMENTS

| | | |
|---|---|---|
| JP | A-05-249493 | 9/1993 |
| JP | A 6-75247 | 3/1994 |
| JP | A-06-118404 | 4/1994 |
| JP | A-08-087034 | 4/1996 |
| JP | A-08-234215 | 9/1996 |
| JP | A-09-082982 | 3/1997 |
| JP | A-10-031235 | 2/1998 |
| JP | A-10-200129 | 7/1998 |
| JP | A-11-145480 | 5/1999 |
| JP | A-11-223834 | 8/1999 |
| JP | 2000-066241 | 3/2000 |
| KR | 2001-0083298 A | 9/2001 |
| TW | 425719 | 3/2001 |

* cited by examiner

ELECTROOPTIC DEVICE COMPRISING A SILICON NITRIDE FILM FORMED DIRECTLY ON THE DATA LINES AND NOT EXISTENT ON A SIDE FACE OF CONTACT HOLES

BACKGROUND OF THE INVENTION

1. Field of Invention

The present invention relates to electrooptic devices, such as liquid crystal devices, manufacturing methods therefor, and various electronic devices, such as projection display devices, each incorporating the electrooptic device.

2. Description of Related Art

According to this type of electrooptic device, in an image display region at which image display is performed, display electrodes, such as pixel electrodes, are provided. In particular, in an active matrix drive, an electronic element, such as thin-film transistor (hereinafter "TFT") or thin-film diode (hereinafter "TFD"), is formed so as to correspond to each pixel electrode. Furthermore, in the related art, a so-called peripheral circuit-incorporated or drive circuit-incorporated electrooptic device can be used, in which a peripheral circuit, such as a drive circuit, e.g., a scanning line drive circuit or data line drive circuit, including a number of electronic elements, such as TFTs or TFDs, is formed in a peripheral region located at the periphery of the image display region on a substrate.

The properties of this type of electronic element, such as a TFT, are varied by the influence of water or moisture, and this variation in properties primarily shortens the life of the electrooptic device itself. Accordingly, in this type of electrooptic device, a protective film is generally formed at the upper side of the electronic elements, such as TFTs, in the entire region including an image display region and a peripheral region.

SUMMARY OF THE INVENTION

In this type of electrooptic device, in addition to increase in device life, enhanced quality of display image has been generally desired, and in view of this desire mentioned above, it is important to perform bright image display with superior color reproducibility.

However, as described above, when the protective film made of a nitride film or the like is formed over the entire substrate including the image display region and the peripheral region, a problem in that the brightness of display image is decreased in accordance with decrease in light transmittance may arise, regardless of the position of the protective film particularly in the case of a transmissive electrooptic device using display electrodes having light transparency. In addition, in the case of a reflective electrooptic device using reflective display electrodes, the same problem as described above may arise when the protective film is provided at the upper side of reflection surfaces of the electrodes. In addition, even when darkness makes it difficult to view, or may be compensated for by an amount of display light, a problem may arise in that a display image is slightly colored in a particular color by frequency dependence of light transmittance of the protective film. In more particular, for example, when a thin nitride film generally having a dense structure and superior moisture resistance is formed as the protective film, a problem in that a display image is slightly colored in yellow may arise.

Enhancement in moisture resistance by the protective film is generally proportional to the thickness thereof. However, a phenomenon, such as decrease in light transmittance or slight coloration in a particular color, is also proportional to the thickness mentioned above. Accordingly, when the moisture resistance is enhanced by the protective film in order to increase the device life, the display image quality is further degraded by the presence of the protective film. As described above, in the related art, it is difficult to achieve the increase in device life and enhancement in display image quality at the same time.

In addition, when the protective film made of a nitride film or the like is present between display electrodes, such as pixel electrodes, and electronic elements, such as transistors, connected thereto, in accordance with the structure thereof, contact holes or the like to connect the upper side of the protective film to the lower side thereof must be formed in some case. However, basically, the protective film made of a nitride film or the like is preferably dense, and hence etching rate thereof is generally low. Accordingly, when the protective film is formed simply over the entire substrate as is the related art technique described above, a step of forming openings for the contact holes or the like becomes difficult to perform, and as a result, in some case, an opening region of each pixel (that is, a region at which light actually performing display passes therethrough or is reflected therefrom) must finally be decreased in order to secure the contact holes, or electrical contact in a limited non-opening region (that is, a region at which no light actually performing display passes therethrough or is reflected therefrom, i.e., a region other than the opening region) in each pixel may become difficult to form. As described above, when the protective film is formed in a manner similar to that of the related art technique, a problem may also arise in that a bright display image may not be obtained since it becomes difficult to increase the opening region in each pixel.

The present invention addresses the problems described above, and provides an electrooptic device capable of reducing or preventing a reduction in display image quality caused by the presence of the protective film while the device life is increased by protecting electronic elements, such as transistors with the protective film; a manufacturing method therefor; and an electronic apparatus, such as a projection display device, incorporating the electrooptic device described above.

In order to address or achieve the above, a first electrooptic device of the present invention includes display electrodes disposed in an image display region on a substrate; electronic elements which are disposed in a peripheral region located at the periphery of the image display region and which form a peripheral circuit; and a protective film formed to cover at least a part of the peripheral region. The protective film is not provided in at least a part of an opening region of each pixel in the image display region.

According to the first electrooptic device of the present invention, the peripheral circuit formed of a number of electronic elements, such as transistors, is used as a drive circuit and supplies image signals or the like to the display electrodes, such as pixel electrodes or electrodes in a striped pattern directly or via electronic elements, such as pixel switching transistors. Accordingly, active matrix drive, passive matrix drive, or the like can be performed. In particular, since at least a part of the peripheral region is covered with the protective film, in accordance with the film thickness, film quality, or the region at which the protective film is provided, the moisture resistance for the electronic elements, such as transistors disposed in the peripheral region can be enhanced. In this case, although light transmittance in the peripheral region is decreased by the presence of the protective film, the display image is not adversely affected. That is, without concern about display image darkened or slightly colored in a particular color, the protective film may be formed so as to have required moisture resistance in the peripheral region at which a peripheral circuit having superior performances necessary for drive frequency, drive current, or the like is formed.

In addition, according to a study performed by the present inventor, various factors described below relating to device life were discovered. The factors mentioned above are as follows: (i) since being disposed in the vicinity of the periphery, the electronic element, such as a transistor in the peripheral region is easily affected by moisture coming from the outside as compared to the electronic element, such as a transistor disposed in the image display region; (ii) since an electrooptic material such as liquid crystal is present in the image display region, the image display region has high moisture resistance as compared to that for the peripheral region; (iii) since complicated, high degree control is not generally necessary for pixel switching control in the image display region, without using complementary transistors, the electronic elements to perform pixel switching may be formed, for example, of N-channel transistors which are not subject to degradation of properties by moisture or water as compared to P-channel transistors; and (iv) the peripheral circuit, such as a drive circuit, is required to have higher performance for drive frequency, drive current, and the like. As a result, it was found that the actual device life of the electrooptic device depends on that of the peripheral circuit. Accordingly, by positively protecting the electronic elements, such as the transistors forming the peripheral circuit so as to increase the life thereof, the life of the entire device can be directly increased. Hence, according to the first electrooptic device, since the device life is significantly increased because of the presence of the protective film covering the peripheral region, it is very advantageous in practice.

On the other hand, in the image display region, since the protective film is not provided in at least a part of the opening region of each pixel, the light transmittance in the opening region may not be decreased since the protective film is not formed. That is, in the image display region, since the protective film is not formed at all or is formed partly, it becomes possible that the image display is not darkened or is not slightly colored.

As a result, according to the first electrooptic device, by using the relatively simple arrangement, the device life can be increased by the protective film, and in addition, degradation of display image quality caused by the presence of the protective film can be prevented or reduced.

According to one configuration of the first electrooptic device of the present invention, the display electrodes are pixel electrodes, and the electrooptic device further includes first transistors which are disposed in the image display region and which are connected to the pixel electrodes. The electronic elements include second transistors.

According to this configuration, by performing switching control of the pixel electrodes using the first transistors, active matrix drive can be performed. In addition, the entire or at least a part of each second transistor forming the peripheral circuit is protected with the protective film, resulting in increase in life of the entire device. Furthermore, since the protective film is not formed in the entire or at least a part of the opening region of each pixel in which the pixel electrode is provided, degradation of display image quality caused by the presence on the protective film can be reduced.

In another configuration of the first electrooptic device of the present invention, the protective film is not provided in the opening region of each pixel.

According to this configuration, since the protective film is not provided in the opening region in each pixel, degradation of display image quality caused by the presence of the protective film can be reduced to the minimum. On the other hand, without concern about degradation of display image quality, a protective film having a sufficiently large thickness or an optional light transmittance can be formed in the peripheral region.

In this configuration, the protective film may be or may not be formed in a non-opening portion in each pixel. In particular, when an electronic element, such as the first transistor to provide pixel switching or the like is provided in the non-opening region in each pixel, by forming the protective film in this non-opening region, the moisture resistance for this electronic element can be enhanced to some extent.

In another configuration of the first electrooptic device of the present invention, the protective film is not provided in the image display region.

According to this configuration, since the protective film is not provided in the image display region, degradation of display image quality caused by the presence of the protective film can be reduced to the minimum. On the other hand, without concern about degradation of display image quality, a protective film having a sufficiently large thickness or an optional light transmittance can be formed in the peripheral region. In particular, since the protective film may be formed only from a picture-frame region, that is, the boundary of the image display region and the peripheral region, to the periphery side, the protective film can be relatively easily formed.

In another configuration of the present invention, the protective film is provided in the entire peripheral region.

According to this configuration, since the protective film is provided in the entire peripheral region, the moisture resistance for the electronic elements, such as the second transistors forming the peripheral circuit can be enhanced to the maximum. In particular, since the protective film may be formed in the entire region from the picture-frame region, that is, the boundary of the image display region and the peripheral region, to the periphery side, the protective film can be relatively easily formed.

In another configuration of the present invention, the protective film is provided in a region overlapping the electronic elements in the peripheral region and is not provided in at least a part of a region that does not overlap each of the electronic elements.

According to this configuration, since the protective film is provided in the region overlapping the electronic elements in the peripheral region, the moisture resistance for the electronic elements can be enhanced. In particular in a laminate structure formed on the substrate, the protective film may not be formed in a region at which the presence of the protective film is not preferable in view of the structure or the manufacturing process thereof. The region mentioned above is, for example, a region at which wires, electrodes, elements, and the like provided at the upper side of the protective film must be connected to those provided at the lower side thereof via contact holes or the like. According to the arrangement thus formed, a step of performing opening for contact holes may be easily performed, and hence the opening for the contact holes or the like can be satisfactory performed in the limited non-opening region of each pixel. As a result, the opening region in each pixel is increased while the protective film is formed, thereby being capable of performing bright image display.

In another configuration of the present invention, the electronic elements include complementary transistors, and the protective film is at least provided in a region overlapping P-channel transistors forming the complementary transistors in the peripheral region.

According to this configuration, since the protective film is provided in the region overlapping the P-channel transistors whose properties are easily degraded by moisture or water as compared to the N-channel transistors, the life of the complementary transistor can be increased by enhancing the moisture resistance for the P-channel transistor. In addition, the protective film may be or may not be provided in a region overlapping the N-channel transistors.

In this configuration, the protective film may not be provided in at least a part of the region overlapping the N-channel transistors forming the complementary transistors in the peripheral region.

According to this structure, in regions among those overlapping the N-channel transistors at which the presence of the protective film is not preferable in view of the structure or the manufacturing process, the protective film may not be formed.

In order to address or achieve the above, a second electrooptic device of the present invention includes display electrodes disposed in an image display region on a substrate; electronic elements which are disposed in a peripheral region located at the periphery of the image display region and which form a peripheral circuit; and a protective film formed so as to cover at least a part of each of the peripheral region and the image display region. The protective film has a relatively large thickness in the peripheral region and a relatively small thickness in the image display region.

According to the second electrooptic device of the present invention, the peripheral circuit formed of a number of electronic elements, such as transistors, is used as a drive circuit and supplies image signals or the like to the display electrodes directly or via electronic elements such as pixel switching transistors. Accordingly, active matrix drive, passive matrix drive, or the like can be performed. In particular, since the peripheral region is covered with the thick protective film, the moisture resistance for the electronic elements, such as transistors disposed in the peripheral region can be enhanced. In this case, although light transmittance in the peripheral region is decreased by the thick protective film, the display image is not adversely affected. That is, the thick protective film can be formed in the peripheral region without concern about display image darkened or slightly colored in a particular color, and hence the protective film can be formed so as to obtain necessary moisture resistance.

Furthermore, according to the study by the present inventor, due to the various factors described above, the practical device life of the electrooptic device depends on that of the peripheral circuit. Hence, the life of the peripheral circuit is increased by positively protecting the electronic elements, such as the transistors forming the peripheral circuit, directly resulting in increase in life of the entire device. Hence, according to the second electrooptic device, since the device life is significantly increased because of the presence of the thick protective film covering the peripheral region, it is very advantageous in practice.

On the other hand, since the protective film provided in the image display region has a small thickness, compared to the case in which a thick protective film is formed as in the peripheral region, the light transmittance in the opening region may not be decreased. That is, in the image display region, when the protective film having a small thickness is formed, the image display may not be substantially darkened or may not be substantially colored, and at the same time, even in the case in which electronic elements, such as the pixel switching transistors, are formed in the image display region, due to the presence of the thin protective film, the moisture resistance can be enhanced to some extent as compared to the case in which no protective film is provided.

As a result, according to the second electrooptic device, by using the relatively simple arrangement, the device life can be increased by the protective film, and in addition, degradation of display image quality caused by the presence of the protective film can be prevented or reduced.

In one configuration of the second electrooptic device of the present invention, the protective film has a relatively small thickness in the entire image display region and has a relatively large thickness in the entire peripheral region.

According to this configuration, since the protective film has a relatively small thickness in the entire image display region and has a relatively large thickness in the entire peripheral region, the moisture resistance for the electronic elements, such as the transistors forming the peripheral circuit, may be increased to the maximum. In particular, since the protective film may be formed to be thick in the entire region from the picture-frame region, which is the boundary between the image display region and the peripheral region, to the peripheral side, and may be formed to be thin in the entire region at the central side of the picture-frame region, the protective film can be relatively easily formed on the whole.

A third electrooptic device of the present invention includes display electrodes disposed in an image display region on a substrate; electronic elements which are disposed in a peripheral region located at the periphery of the image display region and which form a peripheral circuit; protective films formed so as to at least partly cover the peripheral region; and wires extending so as to correspond to non-opening regions other than opening regions of pixels in the image display region. The protective films are provided so as to also at least partly cover the wires.

According to the third electrooptic device of the present invention, the peripheral circuit formed of a number of electronic elements, such as transistors, is used as a drive circuit and supplies image signals or the like to the display electrodes directly or via electronic elements, such as pixel switching transistors. Accordingly, active matrix drive, passive matrix drive, or the like can be performed. In particular, the protective films are formed to cover the peripheral region and the wires extending so as to correspond to the non-opening regions other than the opening regions. Accordingly, the moisture resistance for the electronic elements, such as the transistors in the peripheral region can be enhanced. In addition, since the protective films are formed on the wires, for example, the case can be avoided in which some damage is done to the wires in a manufacturing process for this electrooptic device. The "damage" mentioned above includes, for example, erosion caused by etching performed when the protective films on the wires are etched into a predetermined pattern.

In the present invention, generation of corrosion, disconnections, or the like of the wires may be decreased, and accurate operation of the electrooptic device can be expected. In addition to those described above, for example, compared to the case in which the protective film is only formed in the peripheral region, the areas at which the protective films are formed are relatively increased, an effect of preventing or reducing moisture penetration can be more effectively obtained, and hence the device life can be further increased. In addition, of course, the operational effect of preventing or reducing corrosion, disconnections, and the like of the wires can also serve to increase the device life.

In addition, in the image display region, the protective films are formed so as to only cover the wires, defects in which the image is darkened or is mixed with a slightly colored light hardly occur. That is, high quality image display can still be performed.

Furthermore, according to the study of the present inventor, due to the various factors described above, the practical device life of the electrooptic device depends on that of the peripheral circuit. Hence, the life of the peripheral circuit is increased by positively protecting the electronic elements, such as the transistors forming the peripheral circuit, directly resulting in increase in life of the entire device.

As described above, according to the third electrooptic device, since the device life is significantly increased because of the presence of the protective films covering the peripheral region and the wires, it is very advantageous in practice.

According to one configuration of the third electrooptic device of the present invention, the wires described above contain at least aluminum.

According to this configuration, sine the wires contain aluminum having small electrical resistance, wire delay may not be a problem.

However, since aluminum is a material having a relatively low melting point and a relatively inferior mechanical strength (such as hardness), the damage described above may be done to the wires made of aluminum in a manufacturing process with a high probability. However, in this configuration, since the protective films are formed so as to cover the wires made of aluminum, the concern described above can be substantially dissolved. That is, when the wires are made of aluminum, the presence of the protective films becomes more important.

As described above, in this configuration, wires having lower resistance can be realized, and in addition to that, the wires are not damaged in a manufacturing process. These performances described above, which are generally difficult to obtain at the same time, can be realized by this configuration.

In another configuration of the third electrooptic device of the present invention, the wires include data lines to supply image signals to the display electrodes.

According to this configuration, the problem in that the damage is done to the data lines can be reduced as small as possible. Accordingly, supply of image signals can be smoothly performed, and hence display failures and the like caused by defects of wires hardly occur. Since the data lines are generally formed of a material having low resistance, such as the aluminum mentioned above, in this case, the operational effect of the protective film, which becomes more important as described above, can be obtained.

In another configuration of the third electrooptic device of the present invention, the protective films are provided in the entire peripheral region and in the entire regions at which the wires are formed.

According to the configuration, since the protective films are provided in the entire peripheral region, the moisture resistance for the electronic elements, such as the second transistors, which form the peripheral circuit, can be enhanced to the maximum. In addition, since being formed in the entire region from the picture-frame region, that is, the boundary of the image display region and the peripheral region, to the peripheral side, and in the entire regions at which the wires are formed in the image display region, the protective films are relatively easily formed.

In particular, this configuration provides one of most preferable embodiments in which the effect of preventing or reducing water penetration can be fully utilized. In practice, when the present inventor measured the device life of an electrooptic device having the configuration in which the protective films covered the entire peripheral region and the entire regions at which the data lines, i.e., an example of wires, were formed, it was confirmed that the life was enhanced by approximately five times or more that of a conventional device.

In another configuration of the third electrooptic device of the present invention, the display electrodes are pixel electrodes, and the electrooptic device further includes first transistors which are disposed in the image display region and which are connected to the pixel electrodes and the wires. In this electrooptic device, the electronic elements include second transistors and electrodes connected thereto, and the protective films are formed to cover both the wires and the electrodes which are formed of the same film as that of the wires, the protective films being formed of the same film.

According to this configuration, when switching control of the pixel electrodes is performed by the first transistors, active matrix drive can be performed. In addition, when the protective films protect the entirety of each second transistor forming the peripheral circuit or at least a part thereof, the life of the entire device can be increased.

In particular in this configuration, the wires connected to the first transistors and the electrode connected to the second transistors, which are the electronic elements forming the peripheral circuit, are formed of the same film, and in addition, at the upper side of these wires and the electrodes, the protective films formed of the same film are provided. Accordingly, first, since the wires and the electrodes are simultaneously formed using a material having low resistance, such as aluminum, the manufacturing process can be simplified, or the manufacturing cost can be decreased. In addition, when aluminum or the like is used, problems such as wire delay at the wires and the electrodes may not arise.

In addition, since the protective films are formed at the upper side of both the wires and the electrodes, operational effects relating to manufacturing, which are approximately equivalent to those described above, can be obtained, and at the same time, due to the presence of the protective films, the wires and the electrodes can both be protected. That is, as described above, for example, by etching or the like performed for forming the protective films by patterning, the protective films remain so as to cover the wires and the electrodes, and hence damage may not be done to the wires and the electrodes.

In another configuration of the third electrooptic device of the present invention, the electrooptic device further includes a shading film defining the opening regions. The width of the shading film at least a part thereof overlapping the protective film covering the wire is larger than the width of the protective films.

According to this configuration, since the width of the shading film defining the opening regions is larger than that of each of the protective films covering the wires, when this arrangement is observed in plan view, an embodiment in which the protective films are substantially covered with the shading film is realized. Accordingly, light passing thorough in the vicinity of the shading film reaches the protective film with a very low probability. In addition, even when the light passing thorough in the vicinity of the shading film includes an oblique component, the probability in which the light reaches the protective film is also very low. Hence, light passing through the protective film, that is, slightly colored light, has a very low probability of being mixed with light finally forming an image. Accordingly, in this configuration, an image having higher quality can be displayed.

In particular in the configuration including the shading films, the electrooptic device may further include a counter substrate disposed to oppose the substrate; and an electrooptic material provided between the substrate and the counter substrate in the image display region. The shading film is formed on the counter substrate.

According to this arrangement, an electrooptic device can be realized including an electrooptic material, such as liquid crystal provided between a pair of substrates. Hence, when the electronic elements, such as the first transistors to provide pixel switching or the like are formed in the image display region on the substrate, since the electrooptic material is present on the electronic elements, the moisture resistance for the electronic elements can be enhanced because of the presence of the electrooptic material. In addition, since the protective films are provided for the electronic elements forming the peripheral circuit even though the electrooptic material is not present therefor, by the arrangement described above, the device life can be efficiently and significantly increased on the whole.

In addition, in particular in this configuration, as described above, the shading film is provided on the counter substrate, and the width of this shading film is formed to be larger than that of the protective film described above. Hence, according to this configuration, the operational effect as described above (that is, high quality image display which is not colored) can be obtained because of the relationship of the shading film on the counter substrate and the protective films.

Alternatively, in this configuration, a laminate structure including the display electrodes and the wires is further formed on the substrate, and the shading film may include an embedded shading film constituting a part of the laminate structure.

According to this arrangement described above, since the part of the laminate structure formed on the substrate constitutes the embedded shading film, light incident on the electronic elements, such as the first transistors formed in the image display region can be considerably prevented. Hence, the generation of light leak current is reduced or suppressed, and an image free from flicker or the like can be displayed. In addition, in particular in this configuration, as described above, the shading film includes the embedded shading film, that is, the width of the embedded shading film is formed to be larger than that of the protective film. Hence, according to this configuration, the operational effect as described above can be obtained because of the relationship between the embedded shading film and the protective films.

As a particular example of "embedded shading film" of this configuration, as described below, in addition to capacitance electrode at a fixed potential side, a lower side shading film or the like formed on the substrate and under the electronic elements, such as the first transistors may be mentioned.

In particular in the configuration including the embedded shading film, the display electrodes are pixel electrodes, and the electrooptic device further includes first transistors which are disposed in the image display region and which are connected to the pixel electrodes, and storage capacitances each formed of a capacitance electrode at a pixel potential side, which is connected to both the pixel electrode and the first transistor, a capacitance electrode at a fixed potential side, which is disposed to oppose the capacitance electrode at the pixel potential side, and a dielectric film provided between the capacitance electrode at the pixel potential side and the capacitance electrode at the fixed potential side. The embedded shading film may include the capacitance electrode at the fixed potential side.

According to this arrangement, since the storage capacitances each electrically connected to both the pixel electrode and the first transistor are provided, potential-holding property of the pixel electrode can be significantly enhanced, and as a result, high quality image free from flicker or the like can be displayed.

In addition, in particular in this configuration, the capacitance electrode at the fixed potential side, which forms a part of the storage capacitance, is included in the "embedded shading film", that is, the capacitance electrode at the fixed potential side is included in the "shading film". Accordingly, since the capacitance electrode at the fixed potential side, which is one of a pair of electrodes forming the storage capacitance, serves as an electrode at a fixed potential as being named, and also serves as the shading film, the arrangement of the electrooptic device can be simplified. In addition, in this configuration, since the width of the capacitance electrode at the fixed potential side is larger than that of the protective film, the operational effect described above can be obtained.

In the various configurations including the shading film described above, the width of the shading film is preferably formed to be larger than that of the protective film by 0.2 to 1.0 μm at each edge side.

According to this arrangement described above, since the width of the protective film relative to that of the shading film has a particular and preferable value, failure relating to the colored light described above can be more efficiently dissolved. That is, when the value is smaller than that mentioned above, in other words, when the width of the shading film becomes smaller, since light passing through the opening region generally contains an oblique component, light passing thorough the protective film may be mixed with light forming an image, and as a result, the failure relating to the colored light described above may occur in some cases. In addition, when the value is larger than that mentioned above, that is, when the width of the shading film becomes larger, the opening region is further decreased, which is against the desire for displaying a brighter image. However, according to this configuration, the failures described above hardly occur.

According to another configuration of the third electrooptic device of the present invention, the protective film includes a nitride film, and the nitride film is formed by a plasma CVD method.

According to this configuration, since the protective film includes the nitride film, and the nitride film is formed by a plasma CVD method, a protective film having more superior effect of reducing or preventing water penetration can be formed. The reason for this is that the nitride film relatively has a dense structure.

However, when etching is performed for the nitride film described above to provide patterning, the treatment may be relatively difficult to perform in many cases. In more particular, for example, the reason for this is that the etching rate of the nitride film is low as compared to a film formed of another material. Hence, the etching treatment for the nitride film must be performed by a particularly specified method (such as relatively strong and long time etching). However, in the case described above, unnecessary damage may be done to various constituent elements located under the lower side, in particular, such as data lines used as the wires, with a higher probability.

Accordingly, in the present invention, since the nitride film used as the protective film is formed so as to cover the wires, such as the data lines, the problem described above may not still substantially occur. Hence, in this configuration, while the nitride film having superior effect of preventing or reducing water penetration and machining difficulties is used as the protective film, damage is not substantially done to the wires such as the data lines, and as a result, an electrooptic device which may operate accurately and has a longer life can be provided.

In another configuration of the third electrooptic device of the present invention, the thickness of the protective film is 5 to 35 nm.

According to this configuration, when the thickness of the protective film is controlled within the preferable range, the following operational effects can be obtained. First, since the lower limit of the thickness of the protective film is set to 5 nm, the effect of preventing or reducing water penetration described above can be preferably obtained. When the thickness of the protective film is less than 5 nm, the protective film is too thin, and the effect of preventing or reducing water penetration cannot be fully obtained. Secondarily, since the upper limit of the thickness of the protective film is set to 35 nm, a higher quality image can be displayed. When the thickness of the protective film is excessively increased to more than 35 nm, the degree of coloration of light passing through the protective film is increased, and there may be a problem in that the colored light is mixed with light forming an image. However, in this configuration, the problem described above may not occur. In addition, when the upper limit of the thickness of the protective film is set as described above, in the case in which a laminate structure formed of interlayer insulating films and the like is further formed on the protective film, the sizes of steps formed as the topmost layer of the laminate can be reduced. Accordingly, for example, when an alignment film is formed as the topmost layer to be in contact with liquid crystal, which is an example of an electrooptic material, the alignment film can be formed so that the thickness thereof is as even as possible, and hence rubbing process can be preferably performed for the alignment film. In addition, the case in which the orientation state of liquid crystal is disordered can be most efficiently avoided. That is, since serious orientation defect may not occur, a higher quality image can be displayed.

In another configuration of the third electrooptic device of the present invention, a laminate structure including the display electrodes, the wires, and the protective films is formed on the substrate, and the protective films are formed under a borophospho silicate glass film forming a part of the laminate structure.

According to this configuration, the protective films are formed under the borophospho silicate glass film (hereinafter "BPSG film" in some cases) constituting a part of the laminate structure formed on the substrate. In more particular, in consideration that the first and the second transistors or the like are typically formed at the lower side on the substrate, that is, in the vicinity of the surface of the substrate, the protective films of this configuration may be considered to be provided between the BPSG film and the first and the second transistors.

In the related art, the BPSG film can be generally formed by a low-temperature process and has properties, such as superior flexibility and high water absorbing ability.

First, concerning the first property (formability by a low-temperature process), for example, when the data lines as an example of the wires are formed of aluminum, a BPSG film is advantageously formed after the formation of the data lines. The reason for this is that a high-temperature process cannot be performed for the upper layer of the data lines (when a high-temperature process at 400° C. or more is used, the data lines may melt in some cases).

According to the second property relating to "flexibility", the flatness of the interlayer insulating film can be preferably maintained. The "flexibility" is defined as described below. When a BPSG film is formed on some constituent element, and the surface of the BPSG film more accurately reflects a step of the constituent element, the BPSG film is called "hard", and on the other hand, when the surface of the BPSG film does not, the BPSG film is called "flexible". That is, sufficient flexibility means that when the case in which a BPSG film is formed on the data lines is describe by way of example, the shape (in particular, its height) of the data lines is not accurately reflected on the surface of the BPSG film. On the contrary, when the case is assumed in which an interlayer insulating film having poor flexibility is formed on the data lines, shapes are observed on the interlayer insulating film as if the data lines are accurately transferred thereon, and this is different from that obtained by the flexible interlayer insulating film. In addition, when compared the former with the latter, in general, the former, that is, the BPSG film having sufficient flexibility, is preferably used. The reason for this is that when large steps generate and remain on the surface of the interlayer insulating film, for example, the shapes of the steps are transferred on the surface of an alignment film which is formed as the topmost layer of the laminate structure, and as a result, rubbing treatment may not be evenly performed for the alignment film, or the orientation state of liquid crystal, which is an example of an electrooptic material and is in contact with the alignment film, may be disordered in some cases.

As described above, the BPSG film has various advantages. However, the third property described above, that is, high water absorbing ability, cannot be favorable as far as the present invention is concerned. The reason for this is that water absorbed in the BPSG film may penetrate the pixel switching first transistors or the like. Although being provided, when the protective films are formed at the upper side of the BPSG film, water penetration to the first transistors or the like cannot be effectively prevented. The reason for this is that even when the protective film described above has a sufficient effect of preventing or reducing water penetration, a large amount of water adsorbed or stored beforehand in the BPSG film located at the lower layer side may reach the first transistors or the like.

Accordingly, the protective films of this configuration are formed as the underlayers of the BPSG film. Hence, even when water contained in the BPSG film travels toward the first transistors, the travel thereof can be effectively blocked. As a result, according to this configuration, the device life can be reliably increased.

In particular in this configuration, it is preferable that the interlayer insulating film, which forms the topmost layer among a plurality of interlayer insulating films formed in the laminate structure, be made of the borophospho silicate glass film described above, and on this borophospho silicate glass film, the display electrodes and an alignment film, which can maintain the orientation state of an electrooptic material by being in contact therewith, be formed in that order from the bottom.

According to this configuration, by the "flexibility" described above, the surface (that is, the surface of the BPSG film) of the topmost interlayer insulating film has relatively superior flatness without being processed by particular steps, in other words, without any additional cost. Accordingly, the surface of the alignment film formed on the BPSG film also has superior flatness. Hence, in this arrangement, rubbing treatment for the alignment film can be preferably performed, and in addition, the probability in which the orientation state of the liquid crystal, which is in contact with the alignment film, is disordered can be reduced.

In another configuration of each of the first to the third electrooptic devices according to the present invention, the protective film is a nitride film.

According to this configuration, since the moisture resistance can be significantly enhanced by the protective film made of the nitride film, the lives of the electronic elements, such as transistors forming the peripheral circuit can be increased. In addition, if a thick nitride film is formed in the image display region (in particular, opening region of each pixel), the light transmittance may be decreased, or display image may have a slightly yellowish color in some cases. However, since the protective film is not formed or is formed to be thin in this region, or is formed only on each of the wires, degradation of display image quality caused by the presence of the protective film made of the nitride film can be prevented or reduced.

In this configuration, the nitride film described above may have a thickness of 5 to 2,000 nm.

According to this arrangement, necessary moisture resistance in consideration of device specification can be relatively easily realized. However, a nitride film having smaller or larger thickness than that mentioned above may also be formed as the protective film.

In another configuration of each of the first to the third electrooptic devices according to the present invention, the protective film is formed at the upper side of the electronic elements.

According to this configuration, by covering the electronic elements from the upper side with the protective film, the moisture resistance for the electronic elements can be enhanced. In particular, since the substrate is present at the lower side of the electronic elements, the moisture resistance for the lower side of the electronic elements is essentially high. Accordingly, covering performed from the upper side with the protective film is effective to enhance the moisture resistance for the electronic elements.

In another configuration of each of the first to third electrooptic devices according to the present invention, the protective film is formed at the lower side of the display electrodes in the laminate structure on the substrate.

According to this configuration, by the protective film provided at the lower side of the display electrodes such as the pixel electrodes, the moisture resistance for the electronic elements can be enhanced. In particular, in the case in which a protective film, which is made of a nitride film or an insulating film, is provided in a part of the image display region, or a protective film as described above having a small thickness is formed in the entire image display region, when the protective film is provided at the upper side of the display electrodes, dielectric polarization of the protective film occurs, and as a result, it becomes difficult to appropriately perform voltage application by the display electrodes in accordance with image signals. That is, since the display electrodes can be easily and normally operated, the protective film is advantageously formed at the lower side of the protective film.

In another configuration of each of the first to third embodiments of the present invention, the display electrodes are pixel electrodes, and the electrooptic device further comprises first transistors which are disposed in the image display region and which are connected to the pixel electrodes. The pixel electrodes and the first transistors are connected to each other via contact holes formed in a region at which no protective film is formed.

According to this configuration, the pixel electrodes and the first transistors are connected to each other via contact holes formed in the region at which no protective film is formed. Hence, the case can be avoided in which a manufacturing step of performing opening for the contact holes becomes difficult because of the presence of the protective film. On the contrary, regardless of the opening operation for the contact holes described above, a material may be selected for the protective film so as to enhance the moisture resistance.

In another configuration of each of the first to third embodiments of the present invention, the electrooptic device further includes a counter substrate disposed to oppose the substrate and an electrooptic material provided between the substrate and the counter substrate in the image display region.

According to this configuration, the electrooptic device in which the electrooptic material is provided between the pair of substrates can be realized. Hence, when the electronic elements, such as the first transistors to provide pixel switching are formed in the image display region on the substrate, since the electrooptic material is present at the upper side of the electronic elements, the moisture resistance for the electronic elements can be enhanced by the presence of the electrooptic material. In addition, for the electronic elements forming the peripheral circuits, since the protective film is provided although the electrooptic material is not, by the arrangement described above, the device life can be very efficiently increased on the whole.

In another configuration of each of the first to third embodiments of the present invention, the display electrodes are pixel electrodes, and the electrooptic device further includes first transistors which are disposed in the image display region and which are connected to the pixel electrodes. The first transistors are N-channel transistors.

According to this configuration, the first transistors are N-channel transistors, and the N-channel transistors, which are not subject to degradation of its properties by moisture or water, as compared to P-channel transistors, are formed in the image display region at which the protective film is not at least partly formed or is formed to be thin. As a result, the structure having high moisture resistance on the whole is obtained, and the life of the entire device can be increased.

To address or achieve the objects described above, a method of the present invention for manufacturing an electrooptic device is a method for manufacturing each of the first to third electrooptic devices (also including various configurations thereof) of the present invention. The method described above includes forming electronic elements on a substrate; forming a preform film to be formed into a protective film on the substrate and the electronic elements; removing or thinning the nitride film in at least a part of an image display region by etching so as to form the protective film; and forming the display electrodes in the image display region after the protective film is formed.

According to the method of the present invention for manufacturing the electrooptic device, after the electronic elements, such as transistors are formed on the substrate, a prefilm made of a nitride film or the like, which is to be formed into the protective film, is formed on the substrate and the electronic elements by a low-temperature CVD (Chemical Vapor Deposition), plasma CVD, or the like. Subsequently, this prefilm is removed or thinned in at least a part of the image display region by etching, such as dry etching or wet etching, so that the protective film of the present invention having a predetermined pattern as described above is formed. Next, the display electrodes made of ITO (Indium Tin Oxide) films or the like are formed in the image display region. As a result, the first to the third electrooptic devices of the present invention can be relatively easily formed.

In order to address or achieve the objects described above, an electronic apparatus of the present invention includes one of the first to the third electrooptic devices (also including various configurations thereof) of the present invention described above.

Since the electronic apparatus of the present invention includes one of the first to the third electrooptic devices of the present invention described above, high quality image display can be realized for a long period of time. As electronic apparatuses to which the electrooptic device of the present invention can be applied, for example, there may be mentioned projection display devices, liquid crystal televisions, mobile phones, electronic notebooks, word processors, viewfinder or direct monitoring video tape recorder, workstations, television phones, POS terminals, and touch panels, for example.

The above and other related objects and features of the present invention will be apparent by embodiments described below.

DETAILED DESCRIPTION OF PREFERRED EMBODIMENTS

Hereinafter, embodiments of the present invention will be described with reference to drawings. In the embodiments below, an electrooptic device of the present invention is applied to a liquid crystal device.

First Embodiment

The entire structure of an electrooptic device according to a first embodiment of the present invention is first described with reference to FIGS. 1 to 3. In this embodiment, a TFT active matrix drive liquid crystal device incorporating a drive circuit is described as an example of the electrooptic device.

Figure 1:
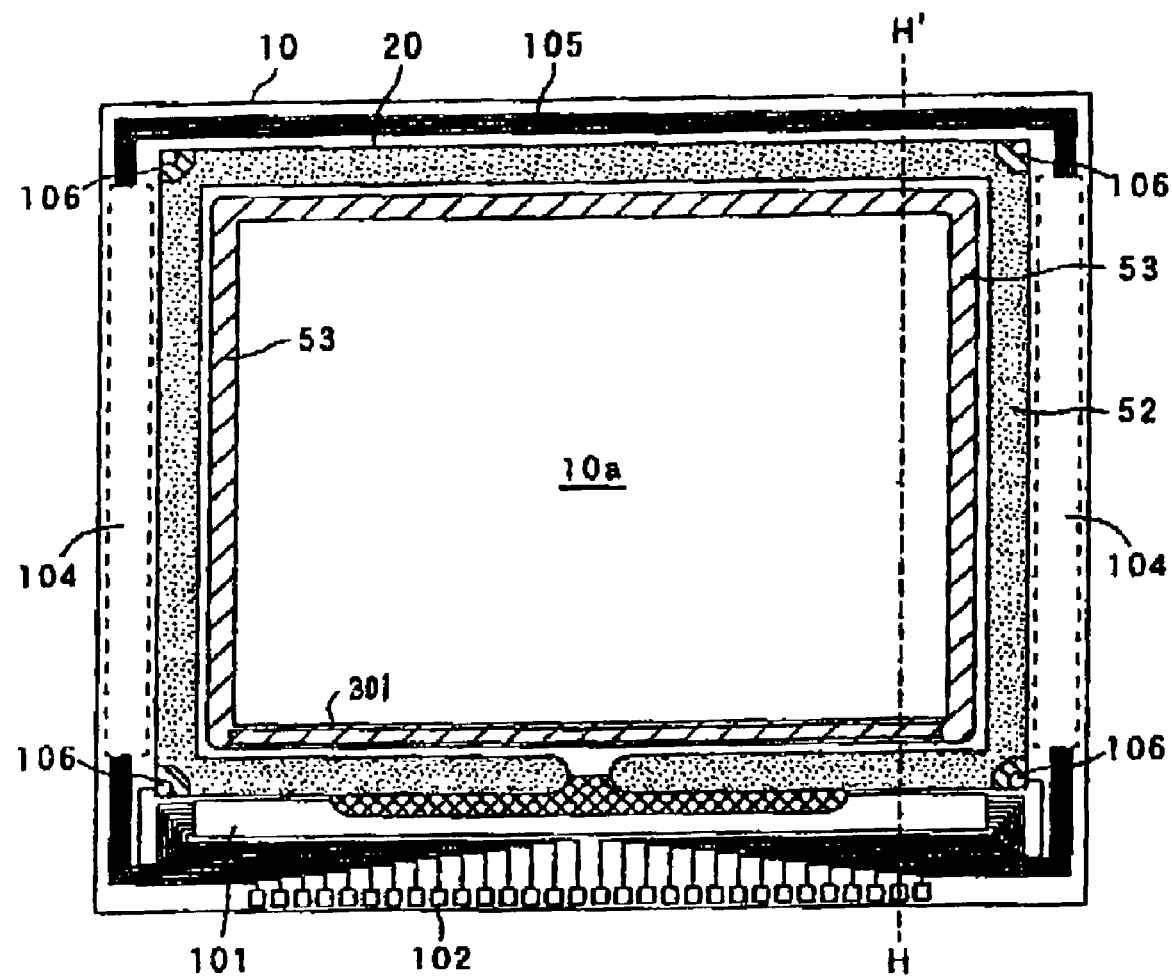
FIG. 1 is a plan view showing a TFT array substrate of an electrooptic device according to a first embodiment of the present invention, the TFT array substrate being viewed together with constituent elements formed thereon from a counter substrate.
Figure 2:
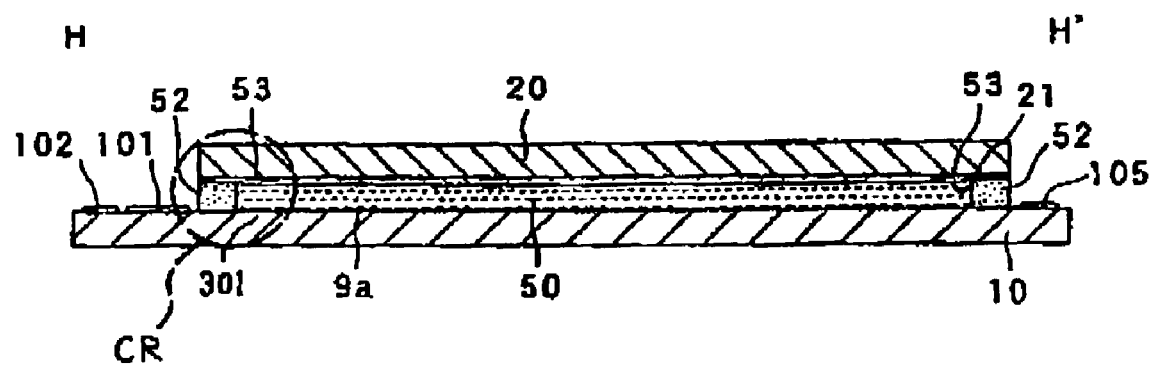
FIG. 2 is a cross-sectional view taken along plane H–H' in FIG. 1.

FIG. 1 is a plan view of a TFT array substrate and various constituent elements formed thereon, being viewed from a counter substrate side, and FIG. 2 is a cross-sectional view taken along plane H–H' in FIG. 1. In addition, FIG. 3 is a plan view showing a region at which a protective film is formed in the plan view in FIG. 1.

In FIGS. 1 and 2, according to the electrooptic device of this embodiment, a TFT array substrate 10 and a counter substrate 20 are disposed to oppose each other. A liquid crystal layer 50 is enclosed between the TFT array substrate 10 and the counter substrate 20, and the TFT array substrate 10 and the counter substrate 20 are bonded to each other with a sealing material 52 which is provided in a sealing region located at the periphery of an image display region 10*a*.

The sealing material 52 is formed, for example, of a U curable resin or a thermosetting resin to bond the two substrates to each other, and is a material to be cured by UV irradiation or heating treatment after being applied onto the TFT array substrate 10 in a manufacturing process. In addition, in the sealing material 52, a gap material, such as glass fibers or glass beads, is dispersed in order to maintain a predetermined distance (gap between substrates) between the TFT array substrate 10 and the counter substrate 20. That is, the electrooptic device of this embodiment is compact as a light valve of a projector and is suitably used to perform expansion display. However, when this electrooptic device is used as a large liquid crystal device, such as a liquid crystal display or a liquid crystal television, to perform direct viewing display, the gap material described above may be contained in the liquid crystal layer 50.

Inside a sealing region at which the sealing material 52 is disposed, in order to define a picture-frame region of an image display region 10a, a picture-frame shading film 53 having shading properties is disposed parallel to the sealing material 52 at the counter substrate 20 side. However, a part or the entirety of the picture-frame shading film thus described may be provided at the TFT array substrate 10 side as an embedded shading film.

In a region outside the periphery of the image display region, in a peripheral region located outside the sealing region at which the sealing material 52 is disposed, a data line drive circuit 101 and an external circuit connection terminal 102 are provided along one side of the TFT array substrate 10, and scanning line drive circuits 104 are provided along two sides thereof adjacent to said one side mentioned above. In addition, at the remaining one side of the TFT array substrate 10, a plurality of wires 105 is provided to connect the scanning line drive circuits 104 provided at both sides of the image display region 10a to each other. In addition, as shown in FIG. 1, vertical conductors 106 functioning as vertical conduction terminals between the two substrates are provided at the four corners of the counter substrate 20. In addition, vertical conduction terminals are provided on the TFT array substrate 10 at regions opposing to those corners described above. Accordingly, the TFT array substrate 10 and the counter substrate 20 can be electrically connected to each other.

In particular in this embodiment, a sampling circuit 301 to sample image signals supplied from the data line drive circuit 101 is disposed in the picture-frame region. However, the sampling circuit 301 mentioned above may be provided at the outside peripheral side of the sealing material 52.

As shown in FIG. 2, an alignment film is formed on pixel electrodes 9a after TFTs to provide pixel switching, and wires to form scanning lines, data lines, and the like are formed on the TFT array substrate 10. On the other hand, on the counter substrate 20, in addition to a counter electrode 21, an alignment film is formed at the topmost layer portion. In addition, the liquid crystal layer 50 is formed of a liquid crystal formed, for example, of one type of nematic liquid crystal or several types thereof mixed with each other, and is placed in a predetermined orientation state between the pair of alignment films mentioned above.

On the TFT array substrate 10 shown in FIGS. 1 and 2, in addition to the data line drive circuit 101, the scanning line drive circuits 104, the sampling circuit 301, and the like, for example, there may be provided a precharge circuit to supply precharge signals having a predetermined voltage level to a plurality of data lines 6a prior to image signals, or an inspection circuit to inspect quality and detecting defects of the electrooptic devices in a manufacturing process or before shipment.

Figure 3:
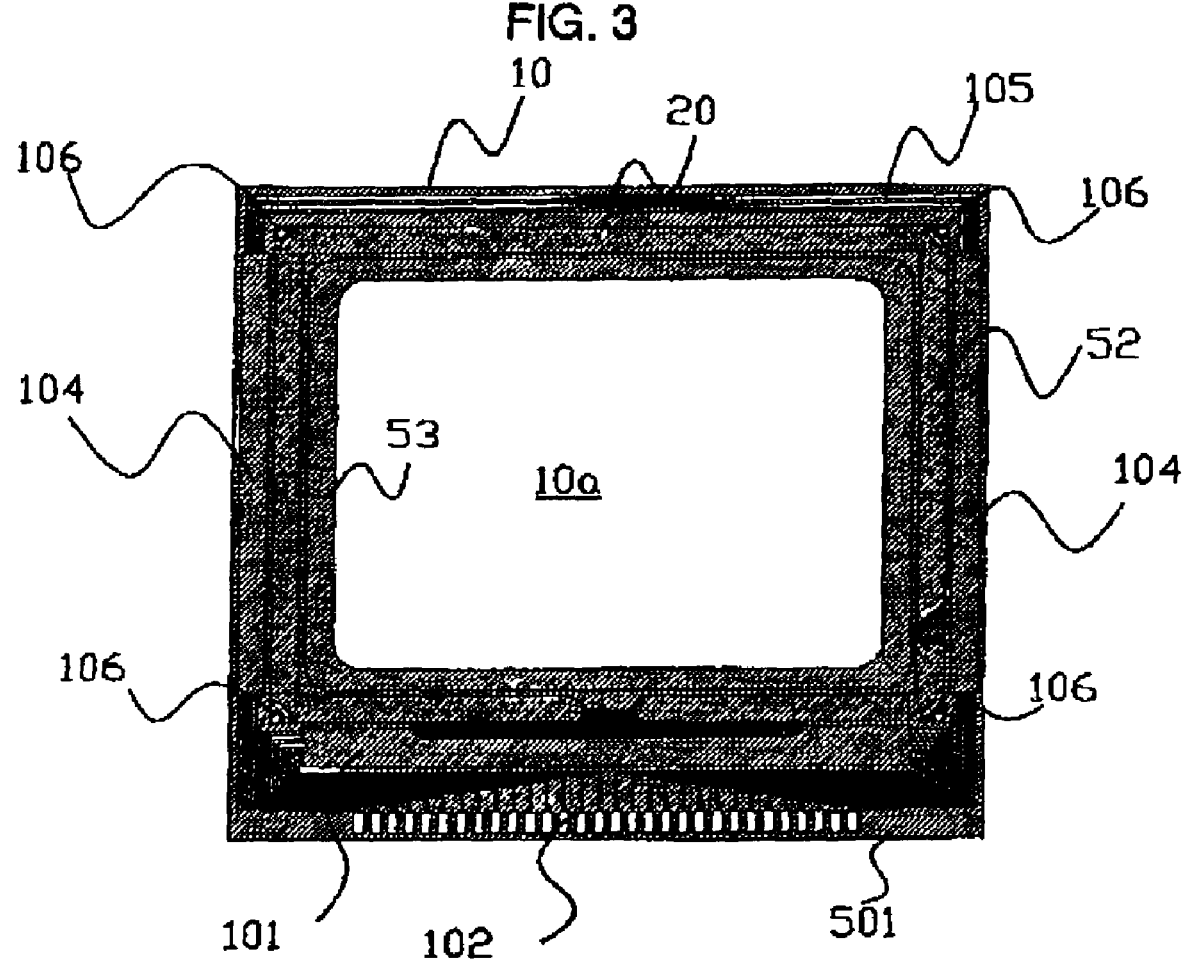
FIG. 3 is a plan view showing a region at which a protective film is formed in the plan view in FIG. 1.

As shown in FIG. 3, in particular in this embodiment, a protective film 501, for example, made of a nitride film, having superior moisture resistance or water resistance is formed in the peripheral region including the picture-frame region on the TFT array substrate 10 other than the image display region 10a. That is, as shown in FIG. 3, the protective film 501 is formed in a region indicated by lines slanting down to the right. However, since the external circuit connection terminal 102 and the vertical conductors 106 are to be electrically connected to the electrodes on the TFT array substrate 10, the protective film 501 provided on those areas must be removed.

In this embodiment, as described above, the protective film 501 is formed to cover at least a part of the peripheral region at which electronic elements, such as TFTs, are formed for constituting peripheral circuits, and is not provided in the image display region 10a including an opening region of each pixel. Hence, in accordance with the thickness and quality of this protective film 501 as well as a region at which the protective film is formed, the moisture resistance can be enhanced for the TFTs and the like disposed in the peripheral region. In this case, although light transmittance is decreased in the peripheral region by the protective film 501, as can be seen in FIG. 3, display images will not be adversely affected. In particular in this embodiment, since the protective film 501 is not provided in the image display region 10a at all, the transparency of the image display region 10a will not be affected at all.

In addition, in the peripheral region at which the peripheral circuits, such as the data line drive circuit 101 required to have high speed drive operation, are formed, when the protective film 501 made of a nitride film or the like is formed, necessary and sufficient moisture resistance can be obtained without concern about a display image darkened or slightly colored in a particular color by the presence of the protective film 501. As a result, as described above, in a peripheral circuit-incorporated or a drive circuit-incorporated electrooptic device, when lives of TFTs, which form the peripheral circuit or drive circuit and which approximately determine the device life, are increased, the device life of the entire electrooptic device can be efficiently increased.

In this embodiment, the protective film 501 is preferably provided in the entire region indicated by the lines slanting down to the right shown in FIG. 3. Accordingly, the moisture resistance for the TFTs and the like forming the peripheral circuits may be optimally enhanced, and in addition, a process to form the protective film 501 including a patterning step can easily performed in general.

The protective film 501 thus formed is formed, for example, of a nitride film having a thickness of 5 to 2,000 nm. By the nitride film as described above, the protective film 501 having high moisture resistance can be relatively easily formed.

In addition, the protective film 501 may be a multilayer film including at least two layers.

Furthermore, in this embodiment, the protective film 501 is preferably provided on the upper side of the TFTs or the like formed as parts of the peripheral circuits on the TFT array substrate 10. Since the TFT array substrate 10 is present under the TFTs and the like, and moisture coming from under the substrate is not substantially present, the protective film 501 which covers the TFTs and the like from the upper side thereof is effective to enhance the moisture resistance.

In addition, in particular in this embodiment, the liquid crystal layer 50 is present in the image display region 10a at which the protective film 501 is not formed, and hence moisture and water can be prevented or substantially prevented from penetrating the TFT array substrate 10 to some extent. That is, according to this embodiment in which the protective film 501 is formed in the peripheral region other than the image display region 10a, it is very advantageous since degradation of display image quality can be prevented or reduced while the moisture resistance can be efficiently enhanced.

Furthermore, in this embodiment, the protective film 501 is preferably provided under the pixel electrodes 9a in a laminate structure formed on the TFT array substrate 10. In particular, when the protective film 501 made of a dielectric film, such as a nitride film is provided at the upper side of the pixel electrodes 9a, it may become difficult for the pixel electrodes 9a to appropriately perform voltage application in accordance with image signals in some cases because of dielectric polarization of the protective film 501. Hence, as described above, the protective film 501 is effectively disposed at the lower side.

As a result, according to this embodiment, by using a relatively simple arrangement, the device life can be enhanced by the protective film 501, and in addition, degradation of display image quality caused by the presence of the protective film 501 can be avoided, suppressed, or reduced.

Figure 4:
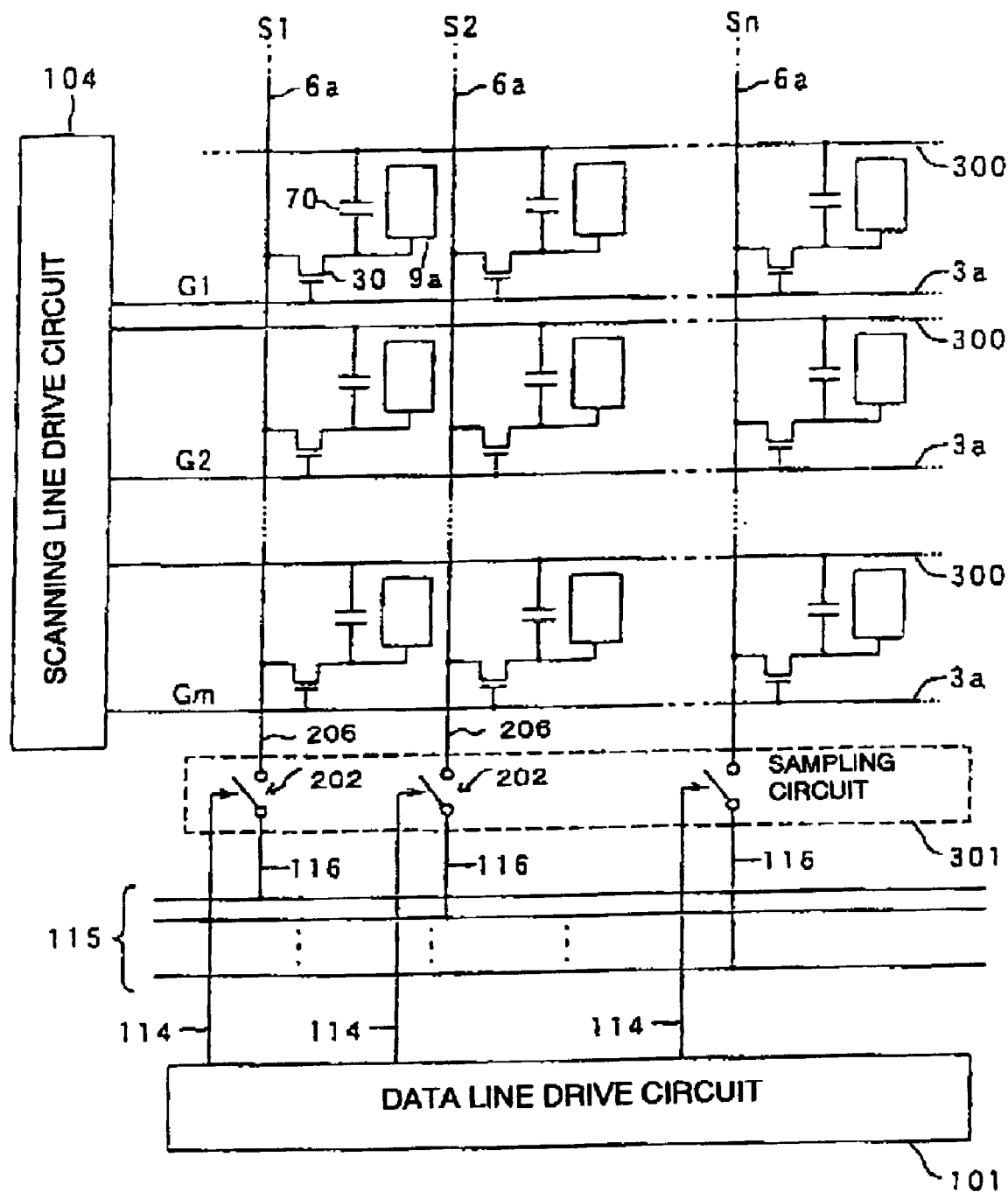
FIG. 4 is a schematic showing an equivalent circuit of various elements, wires, and the like, which are provided for a plurality of pixels in a matrix to form an image display region of the electrooptic device according to the first embodiment of the present invention, together with a peripheral circuit.

Next, the circuit structure of the electrooptic device formed as described above and the operation thereof will be described with reference to FIG. 4. FIG. 4 is a schematic showing an equivalent circuit of various elements, such as wires and the like, which are provided for a plurality of pixels in a matrix forming the image display region of the electrooptic device, together with the peripheral circuits.

As shown in FIG. 4, in each of the plurality of pixels arranged in a matrix forming the image display region of the electrooptic device according to the present invention, the pixel electrode 9a and a TFT 30 to perform switching control of the pixel electrode 9a are formed, and the data line 6a is electrically connected to the source of the corresponding TFT 30.

In the peripheral region outside the image display region 10a, one end of each data line 6a (lower end in FIG. 4) is connected to a drain of a TFT 202, which is an example of a switching circuit element forming the sampling circuit 301. On the other hand, image signal lines 115 are connected to sources of the TFTs 202 of the sampling circuit 301 via lead wires 116. Sampling circuit drive signal lines 114 connected to the data line drive circuit 101 are connected to gates of the TFTs 202 of the sampling circuit 301. In addition, image signals S1, S2, . . . , Sn supplied via the image signal lines 115 are sampled by the sampling circuit 301 and are then supplied to the respective data lines 6a in response to sampling circuit drive signals supplied from the data line drive circuit 101 via the sampling circuit drive signal lines 114.

The image signals S1, S2, . . . , Sn stored in the data lines 6a thus described may be supplied in that order in a line-sequential manner, or may be supplied to each group formed of a plurality of neighboring data lines 6a.

In addition, the scanning lines 3a are electrically connected to gates of the pixel switching TFTs 30, and scanning signals G1, G2, . . . , Gm are impressed pulse wise to the scanning lines 3a with a predetermined timing in that order in line-sequential manner. The pixel electrodes 9a are electrically connected to drains of the TFTs 30, and by closing the switches of the TFTs 30, which are switching elements, for a predetermined period of time, the pixel electrodes 9a store with a predetermined timing the image signals S1, S2, . . . , Sn supplied from the data lines 6a. The image signals S1, S2, . . . , Sn having a predetermined level stored in liquid crystal used as an example of an electrooptic material via the pixel electrodes 9a are maintained with counter electrode 21 formed on the counter substrate for a predetermined period of time. Since the orientation and order of liquid crystal molecules change in accordance with a voltage level to be applied thereto, light can be modulated, thereby realizing grayscale display. In the case of a normally white mode, transmittance for incident light is decreased in accordance with a voltage applied to each pixel, in the case of normally black mode, transmittance for incident light is increased in accordance with a voltage applied to each pixel, and as a result, light having contrast in accordance with an image signal is emitted from the electrooptic device. In this step, in order to prevent the image signal thus maintained from leaking, a storage capacity 70 is additionally provided parallel with a liquid crystal capacity formed between the pixel electrode 9a and the counter electrode 21. In parallel with the scanning lines 3a, capacitor lines 300 are provided, each including a capacitance electrode at a fixed potential side of the storage capacitance 70 and being fixed at a constant potential.

Figure 5:
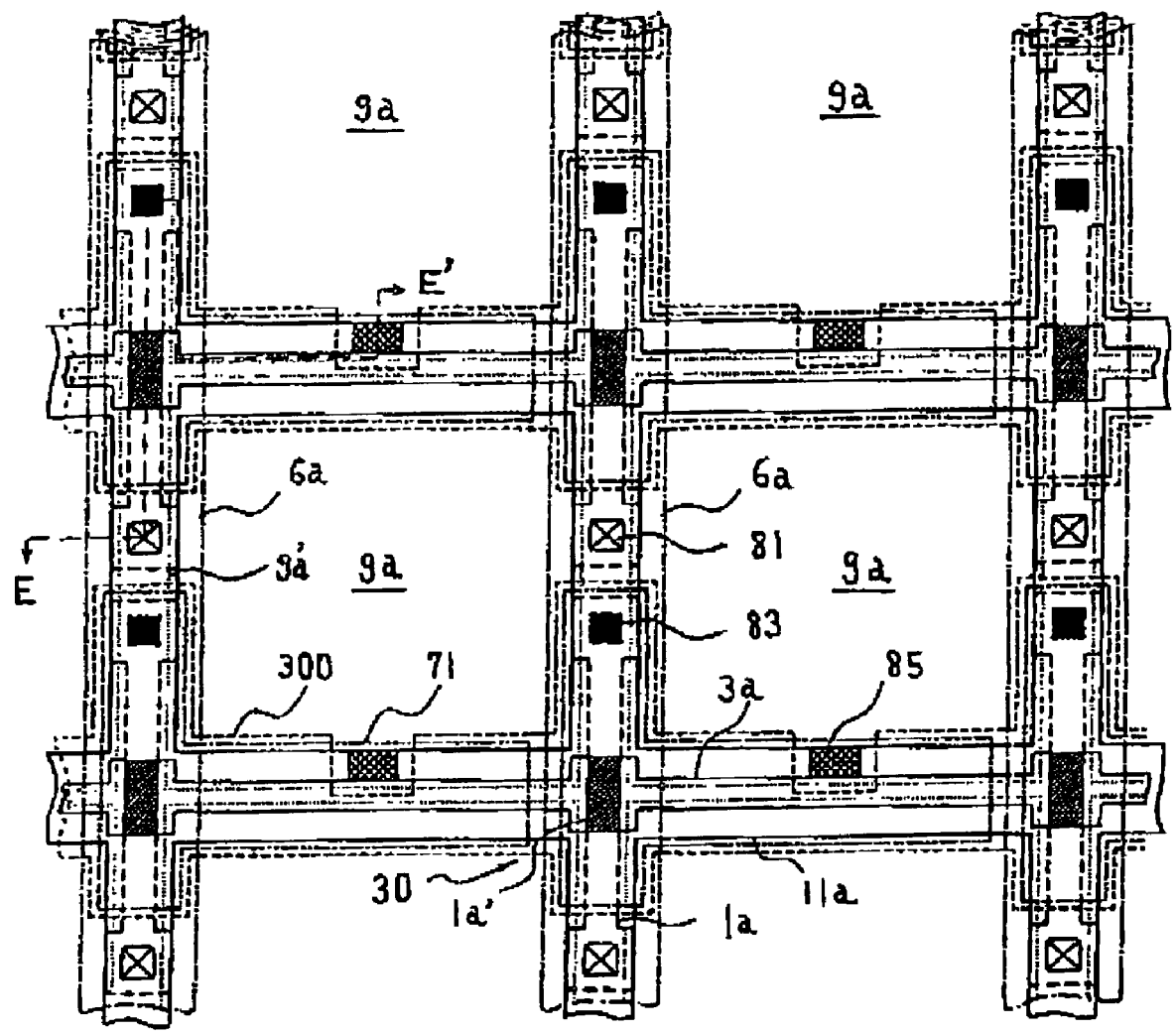
FIG. 5 is a plan view showing a plurality of neighboring pixels on a TFT array substrate of an electrooptic device according to an embodiment, in which data lines, scanning lines, pixel electrodes, and the like are formed on the TFT substrate.
Figure 6:
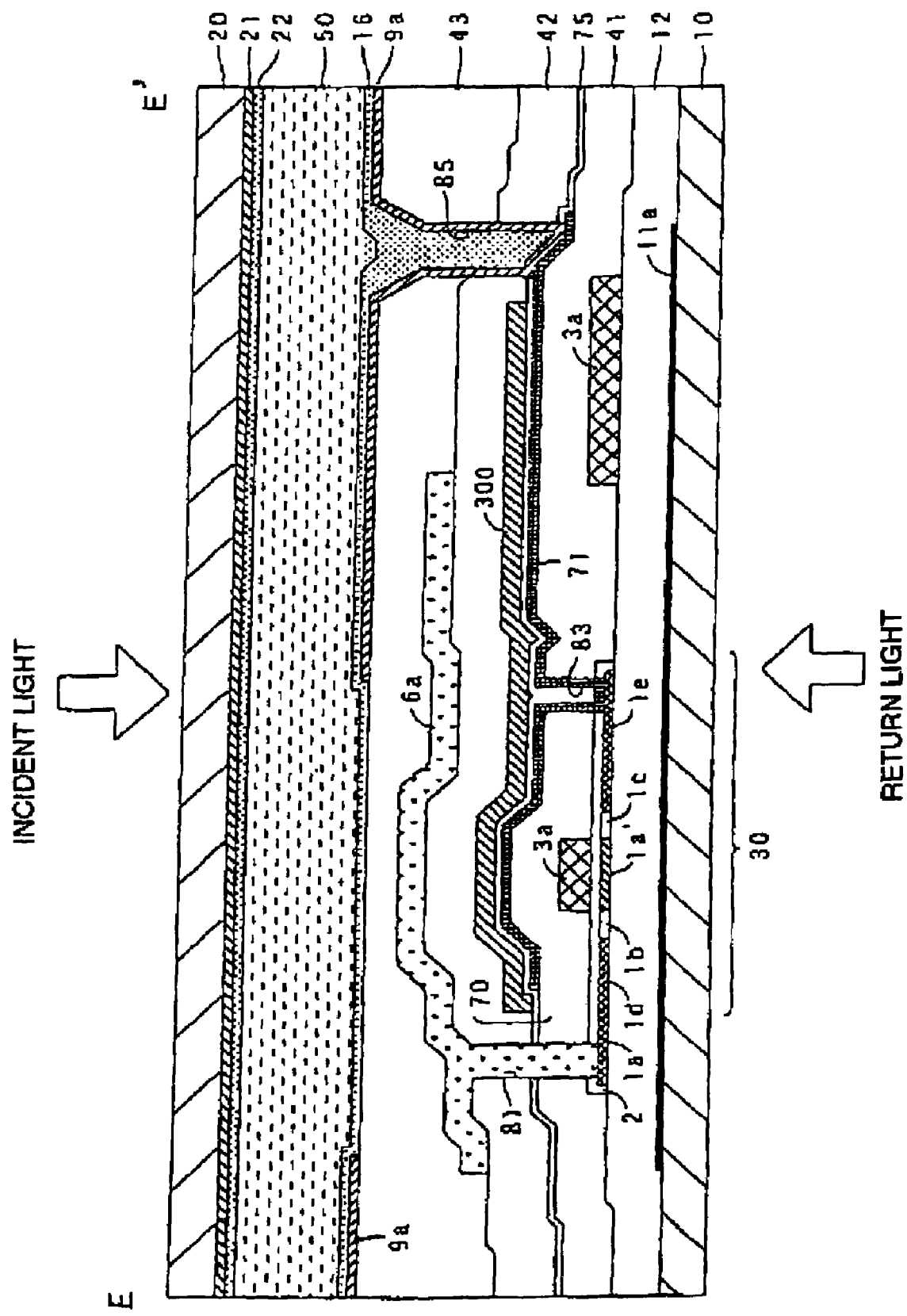
FIG. 6 is a cross-sectional view taken along plane E–E' in FIG. 5.

Next, the arrangement of the image display region of the electrooptic device according to this embodiment of the present invention will be described with reference to FIGS. 5 and 6. FIG. 5 is a plan view showing a plurality of neighboring pixels on the TFT array substrate on which the data lines, scanning lines, pixel electrodes, and the like are formed. FIG. 6 is a cross-sectional view taken along plane E–E' in FIG. 5. In FIG. 6, in order to recognize individual layers and members in the drawing, the reduction scales thereof are different from each other.

As shown in FIG. 5, on the TFT array substrate of the electrooptic device, a plurality of transparent pixel electrodes 9a (outline thereof is indicated by a dot line portion 9a') is provided in a matrix, and along the longitudinal and lateral boundaries of the pixel electrodes 9a, the data lines 6a and the scanning lines 3a are provided, respectively.

In addition, the scanning lines 3a are disposed so as to oppose channel regions 1a' indicated by lines slanting up to the right in a semiconductor layer 1a, and the scanning lines 3a serve as a gate electrode. As described above, at each of intersections between the scanning lines 3a and the data lines 6a, the pixel switching TFT 30 is provided in which the scanning line 3a functioning as the gate electrode is disposed to oppose the channel region 1a'.

As shown in FIGS. 5 and 6, the storage capacitance 70 is formed of a relay layer 71, which functions as a capacitance electrode at a pixel potential side and which is connected to a heavily doped drain region 1e of the TFT 30 and the pixel electrode 9a, and a part of the capacitance line 300 which opposes the relay layer 71 with a dielectric film 75 provided therebetween.

When being viewed in plan, the capacitance lines 300 extend along the scanning lines 3a to form a striped pattern and protrude up and down at the positions intersecting the TFTs 30 in FIG. 5. The capacitance line 300 described above preferably has a multilayer structure formed of a first film formed of a conductive polysilicon film or the like approximately 50 nm thick and a second film formed, for example, of a metal silicide film having a thickness of approximately 150 nm and containing a high-melting-point metal. According to the arrangement described above, the second film functions as the capacitance line 300 or the capacitance electrode of the storage capacitance 70 at the fixed potential side and also functions as a shading layer to shade the TFT 30 from light incident from the upper side thereof.

In particular in this embodiment, since the capacitance line 300 is provided between the scanning line 3a and the data line 6a, the capacitance is formed in an overlapping area of the scanning line 3a and the data line 6a when viewed in plan, and hence the storage capacitance 70 can be increased.

In addition, under the TFTs 30 on the TFT array substrate 10, a lower side shading film 11a having a lattice pattern is provided. The lower side shading film 11a is formed, for example, of a single metal, alloy, metal silicide, polysilicide, or laminate thereof, each containing at least one high-melting-point metal, such as Ti (titanium), Cr (chromium), W (tungsten), Ta (tantalum), or Mo (molybdenum).

In addition, since the data lines 6a extending in the longitudinal direction in FIG. 5 and the capacitance lines 300 extending in the lateral direction in FIG. 5 intersect each other, and the lower side shading film 11a is formed in a lattice pattern, the opening region of each pixel is defined.

As shown in FIGS. 5 and 6, the data line 6a is electrically connected to a heavily doped source region 1d in the semiconductor layer 1a formed, for example, of a polysilicon film via a contact hole 81. Alternatively, after a relay layer is formed of the same layer as that for the relay layer 71 described above, the data line 6a and the heavily doped source region 1d may be electrically connected to each other via the relay layer mentioned above and two contact holes.

In addition, the capacitance lines 300 preferably extend from the image display region 10a (see FIG. 1) in which the pixel electrodes 9a are disposed to the periphery thereof and are electrically connected to a constant potential source, so that the capacitance lines each have a fixed potential. As the constant potential source mentioned above, a constant potential source, such as a positive or negative power source supplied to the data line drive circuit 101 or the scanning line drive circuit 104 may be used, or in addition, a constant potential supplied to the counter electrode 21 on the counter substrate 20 may also be used. Furthermore, in order to avoid or reduce an adverse affect of potential variation to the TFT 30, as is the capacitance line 300, it is also preferable that the lower side shading film 11a provided under the TFT 30 extend from the image display region 10a to the periphery thereof and be connected to a constant potential source.

The pixel electrode 9a is electrically connected to a heavily doped drain region 1e in the semiconductor layer 1a via contact holes 83 and 85, which are connected to each other by the relay layer 71.

As shown in FIGS. 5 and 6, the electrooptic device includes the transparent TFT array substrate 10 and the transparent counter substrate 20 opposing thereto. The TFT array substrate 10 is formed, for example, of a quartz substrate, glass substrate, or silicon substrate, and the counter substrate 20 is formed, for example, of a glass substrate or quartz substrate.

As shown in FIG. 6, the TFT array substrate 10 is provided with the pixel electrodes 9a, and at the upper side thereof, there is provided an alignment film 16 which is processed by a predetermined alignment treatment, such as rubbing treatment. The pixel electrode 9a is formed, for example, of a transparent conductive film such as an ITO film. In addition, the alignment film 16 is formed, for example, of a transparent organic film such as a polyimide film.

On the other hand, over the entire surface of the counter substrate 20, the counter electrode 21 is provided, and at the lower side thereof, there is provided an alignment film 22 which is processed by a predetermined alignment treatment such as rubbing treatment. The counter electrode 21 is formed, for example, of a transparent conductive film, such as an ITO film. In addition, the alignment film 22 is formed, for example, of a transparent organic film, such as a polyimide film.

On the counter substrate 20, a shading film having a lattice or stripe pattern may be provided so as to correspond to non-opening regions of the pixels. According to the arrangement described above, by the shading film on the counter substrate 20 in addition to the capacitance lines 300 and the data lines 6a, which define the non-opening regions as described above, light incident from the counter substrate 20 side can be reliably prevented or substantially prevented from entering the channel regions 1a', lightly doped source regions 1b, and lightly doped drain regions 1c. Furthermore, when the shading film thus formed on the counter substrate 20 has a surface made of a highly reflective film on which light is incident, increase in temperature of the electrooptic device can be prevented or reduced. In addition, the shading film on the counter substrate 20 described above preferably has a narrow width so as to be placed in each non-opening region with sufficient margins at both sides, so that the opening region of each pixel is not decreased by displacement which may occur when the two substrates are bonded to each other. Even when the shading film is formed as described above, shading is redundantly performed, and in addition, the effect of preventing or reducing increase in temperature in the electrooptic device caused by incident light can be fully obtained.

In the arrangement described above, in a space surrounded by the sealing material 52 (see FIGS. 1 and 2) which is provided between the TFT array substrate 10 and the counter substrate 20 disposed to oppose thereto, liquid crystal which is an example of an electrooptic material is enclosed, thereby forming the liquid crystal layer 50.

Furthermore, under the pixel switching TFT 30, an underlayer insulating film 12 is provided. In addition to a function of performing interlayer insulation between the TFT 30 and the lower side shading film 11a, the underlayer insulating film 12 also has a function of preventing or reducing variation in properties of the pixel switching TFTs 30. Since the underlayer insulating film 12 is formed over the entire surface of the TFT array substrate 10, the variation in properties caused, for example, by a roughened surface of the TFT array substrate 10 in polishing, or remaining stains after washing can be prevented or reduced.

In FIG. 6, the pixel switching TFT 30 has the LDD (Lightly Doped Drain) structure and comprises the scanning line 3a; the channel region 1a' in the semiconductor layer 1a in which a channel is formed by an electric field from the scanning line 3a; an insulating film 2 including a gate insulating film which insulates the scanning line 3a from the semiconductor layer 1a; the lightly doped source region 1b and the lightly doped drain region 1c in the semiconductor layer 1a; and the heavily doped source region 1d and the heavily doped drain region 1e in the semiconductor layer 1a.

On the scanning line 3a, a first interlayer insulating film 41 is formed in which the contact holes 81 and 83 extending to the heavily doped source region 1d and the heavily doped drain region 1e, respectively, are formed.

On the first interlayer insulating film 41, the relay layer 71 and the capacitance line 300 are formed, and on those mentioned above, a second interlayer insulating film 42 is formed in which the contact holes 81 and 85 extending to the heavily doped source region 1d and the relay layer 71, respectively, are formed.

On the second interlayer insulating film 42, the data line 6a is formed, and on those mentioned above, a planarized third interlayer insulating film 43 is formed in which the contact hole 85 extending to the relay layer 71 is formed. The pixel electrode 9a is provided on the upper surface of the third interlayer insulating film 43 thus formed.

In this embodiment, the surface of the third interlayer insulating film 43 is planarized by CMP (Chemical Mechanical Polishing) treatment or the like, and hence orientation defect of the liquid crystal in the liquid crystal layer 50 can be reduced, the defect being caused by steps formed by various wires or elements present under the third interlayer insulating film 43.

As has thus been described, according to the first embodiment, since being not formed in the opening region of each pixel in the image display region 10a, the protective film 501 does not decrease the light transmittance and does not allow the display image to be colored in a slight, particular color. At the same time, since the protective film 501 is provided in the peripheral region, the peripheral circuits are not subject to degradation by moisture or water, and hence a high quality image can be displayed for a long period of time.

According to the embodiment described above, as shown in FIG. 6, since a number of conductive layers are formed to produce a multilayer structure, steps are formed on the underlying surface (that is, the surface of the third interlayer insulating film 43) of the pixel electrode 9a in regions along the data line 6a and the scanning line 3a, and the formation of the steps are suppressed or reduced by planarizing the surface of the third interlayer insulating film 43. In addition to or instead of this treatment, for example, another planarization treatment may be mentioned in which grooves are formed in the TFT array substrate 10, the underlayer insulating film 12, the first interlayer insulating film 41, the second interlayer insulating film 42, or the third interlayer insulating film 43, and wires such as the data lines 6a, the TFTs 30, and the like are formed in the grooves mentioned above; in which steps on the upper surface of the second interlayer insulating film 42 are planarized by CMP treatment or the like; or in which organic or inorganic SOG is used for planarization.

Second Embodiment

Figure 7:
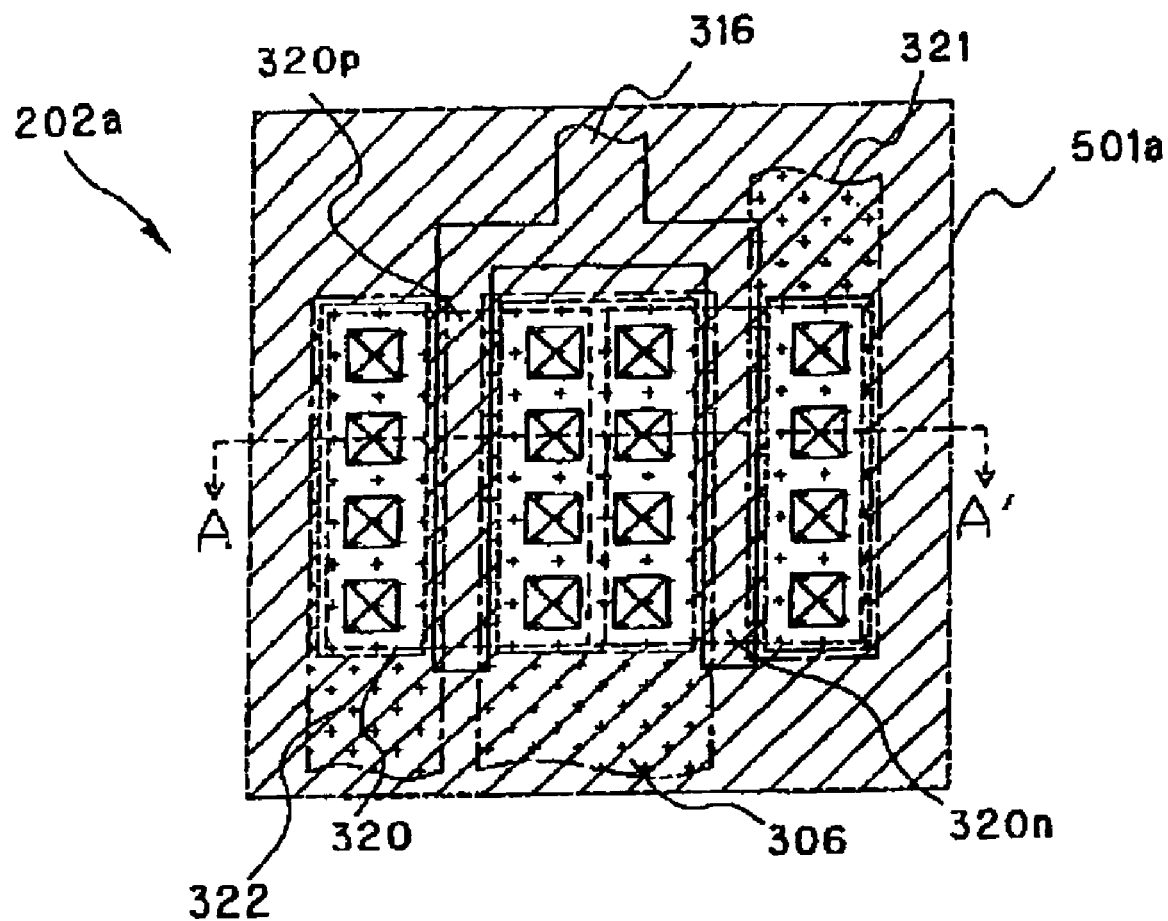
FIG. 7 is an enlarged plan view showing complementary transistors forming a peripheral circuit, according to a second embodiment of the present invention.
Figure 8:
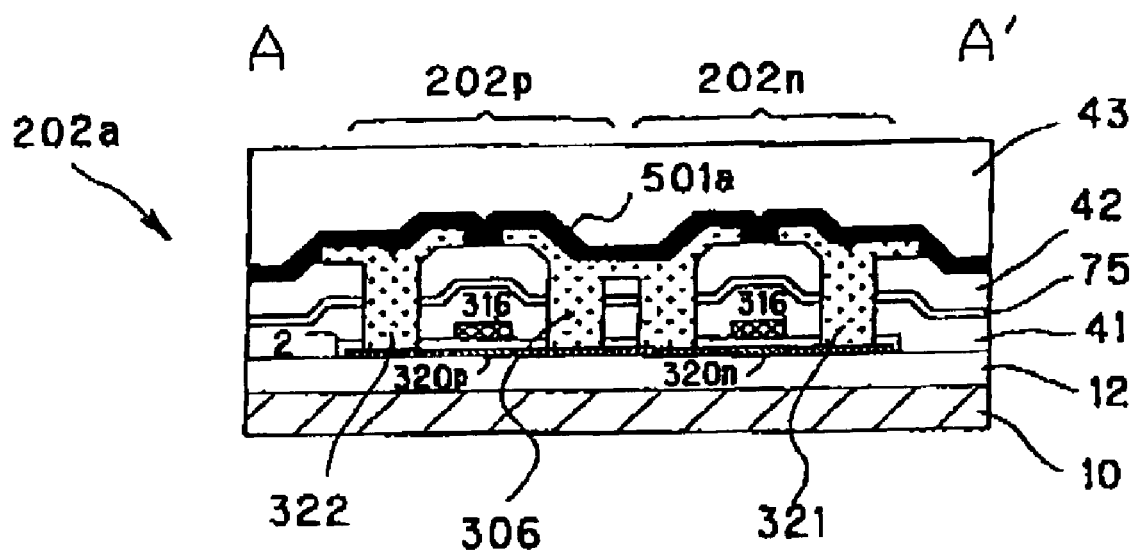
FIG. 8 is cross-sectional view taken along plane A–A' in FIG. 7.

An electrooptic device according to a second embodiment of the present invention is described with reference to FIGS. 7 and 8. The second embodiment relates to a particular example of a planar shape of the protective film 501 for electronic elements, such as TFTs formed in the peripheral region, and the entire arrangement of the electrooptic device is equivalent to that described in the first embodiment. FIG. 7 is an enlarged plan view showing complementary TFTs of the second embodiment as an example of an electronic element formed in the peripheral region, and FIG. 8 is a cross-sectional view taken along plane A–A'. In addition, in FIGS. 7 and 8, the same reference numerals of the constituent elements of the first embodiment shown in FIGS. 1 to 6 designate the same constituent elements, and descriptions thereof are omitted.

As shown in FIGS. 7 and 8, a complementary TFT 202a provided on the TFT array substrate 10 in the vicinity of, for example, the CR portion shown in FIG. 2 has a semiconductor layer 320 including a P-channel region 320p and an N-channel region 320n. In addition, the complementary TFT 202a is formed by combination of a P-channel TFT 202p and an N-channel TFT 202n, in which front ends of a wire 316 are used as gate electrodes (input side), front ends of a low potential wire 321 and a high potential wire 322 are used as source electrodes, and front ends of a wire 306 are used as drain electrodes (output side). The P-channel TFT 202p and N-channel TFT 202n described above may have the LDD structure as is the pixel switching TFT 30. In particular in the second embodiment, by covering the entire complementary TFT 202a from the upper side with a protective film 501a formed of a nitride film or the like, moisture and water are prevented or substantially prevented from penetrating into the complementary TFT 202a. The rest of the structure is equivalent to that of the first embodiment described with reference to FIGS. 1 to 6.

Hence, according to the second embodiment, the moisture resistance for the complementary TFT 202a can be enhanced, the life thereof can be increased, the life of the peripheral circuit incorporating the complementary TFT 202a can be increased, and as a result, the life of the electrooptic device itself can be increased.

Third Embodiment

Figure 9:
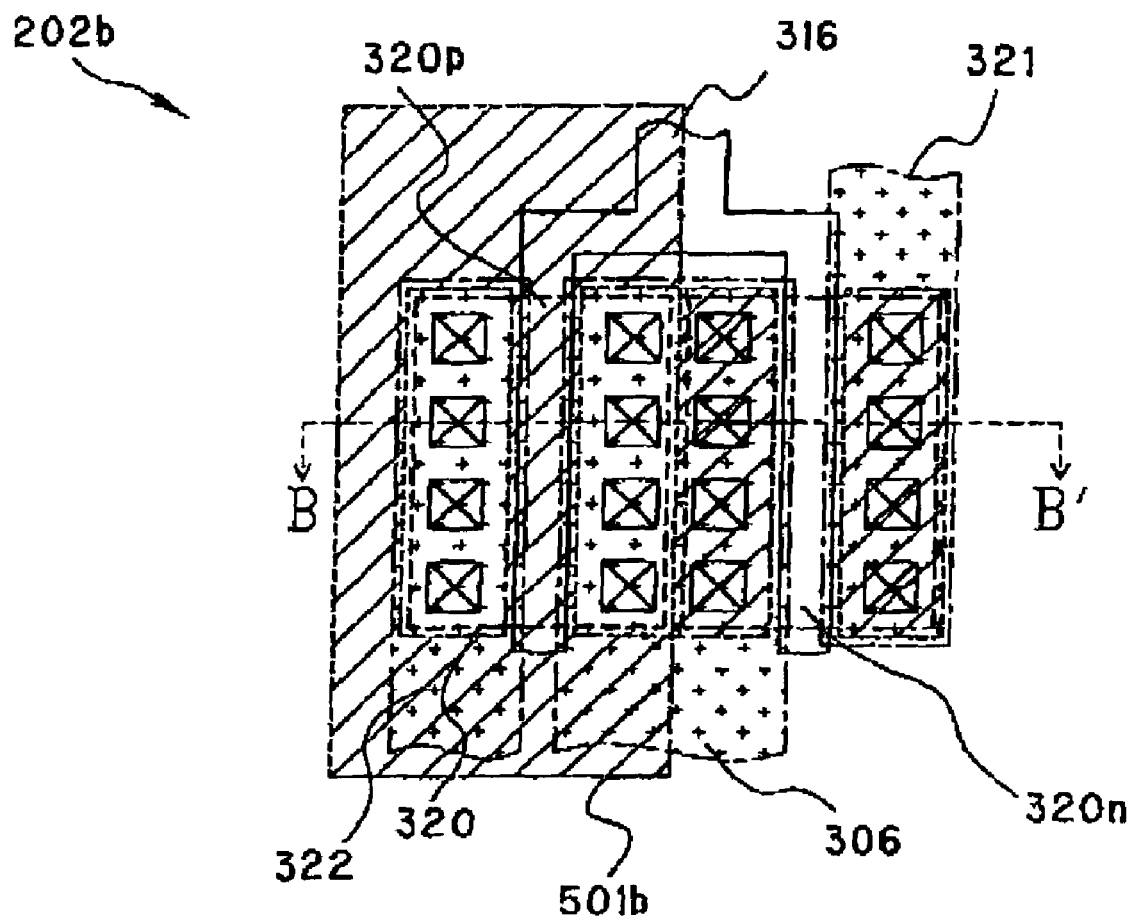
FIG. 9 is an enlarged plan view showing complementary transistors forming a peripheral circuit, according to a third embodiment of the present invention.
Figure 10:
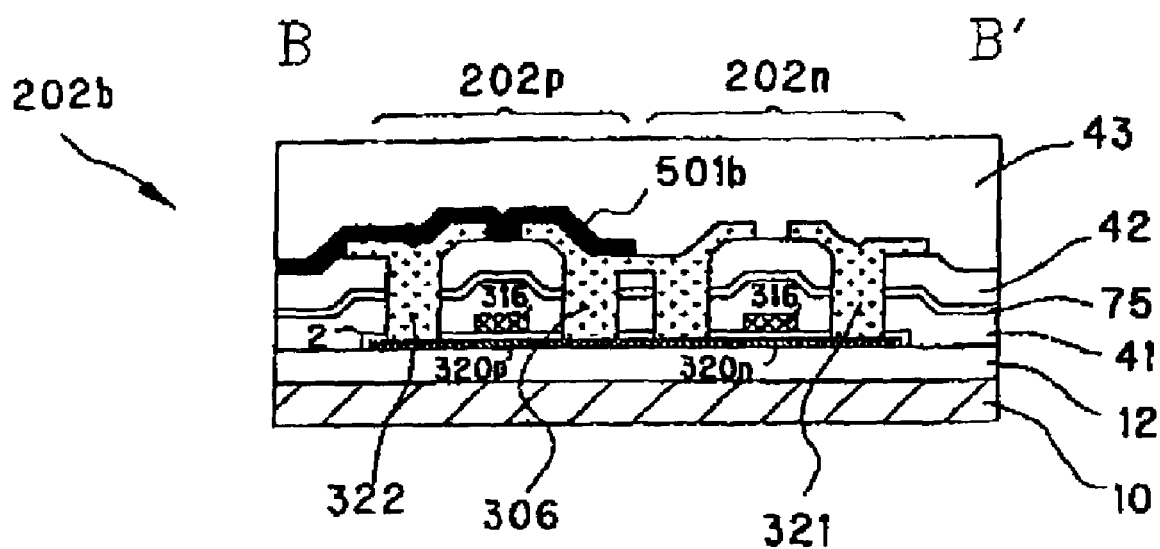
FIG. 10 is cross-sectional view taken along plane B–B' in FIG. 9.

An electrooptic device according to a third embodiment of the present invention is described with reference to FIGS. 9 and 10. The third embodiment relates to another particular example of a planar shape of the protective film 501 for electronic elements, such as TFTs formed in the peripheral region, and the entire structure of the electrooptic device is equivalent to that described in the first embodiment. FIG. 9 is an enlarged plan view of complementary TFTs as an example of an electronic element of the third embodiment formed in the peripheral region, and FIG. 10 is a cross-sectional view taken along plane B–B' in FIG. 9. In FIGS. 9 and 10, the same reference numerals of the constituent elements of the first embodiment shown in FIGS. 1 to 6 designate the same constituent elements, and descriptions thereof are omitted.

As shown in FIGS. 9 and 10, in particular in the third embodiment, a protective film 501b made of a nitride film or the like is formed so as to cover the P-channel TFT 202p of the complementary TFT 202a from the upper side and is not provided at the upper side of the N-channel TFT 202n. The rest of the structure is equivalent to that of the second embodiment described with reference to FIGS. 7 and 8.

Hence, according to the third embodiment, the protective film 501b is provided only on a region overlapping the P-channel TFTs 202p which are subject to degradation of properties by moisture or water as compared to the N-channel TFT 202n. Accordingly, by enhancing the moisture resistance for the P-channel TFT 202p which approximately determines the life of the complementary TFT 202a, the life of the complementary TFT 202a can be efficiently increased.

In this embodiment, the protective film 501b described above may not be provided at the upper side of a number of the N-channel TFTs 202n formed in the peripheral region at all. However, the protective film 501b may not be provided only for N-channel TFTs 202n that are formed in a region at which the presence of the protective film 501b is not preferable in view of the structure on the TFT array substrate 10 or the manufacturing process. In addition, the protective film 501b may not be provided exceptionally for P-channel TFTs 202p that are formed in a region at which the presence of the protective film 501b is not preferable in view of the structure on the TFT array substrate 10 or the manufacturing process.

Fourth Embodiment

Figure 11:
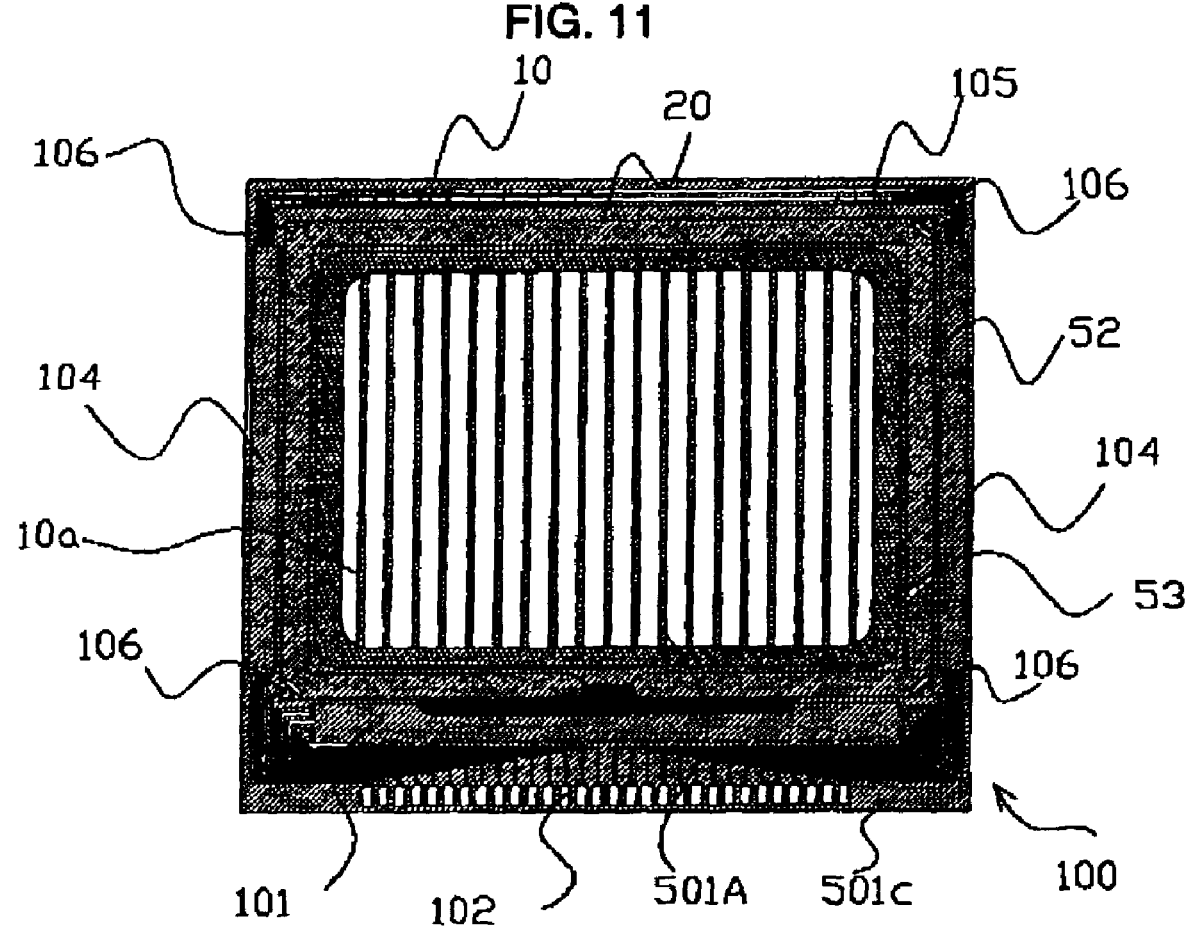
FIG. 11 is a plan view showing regions at which protective films are formed according to a fourth embodiment of the present invention.
Figure 12:
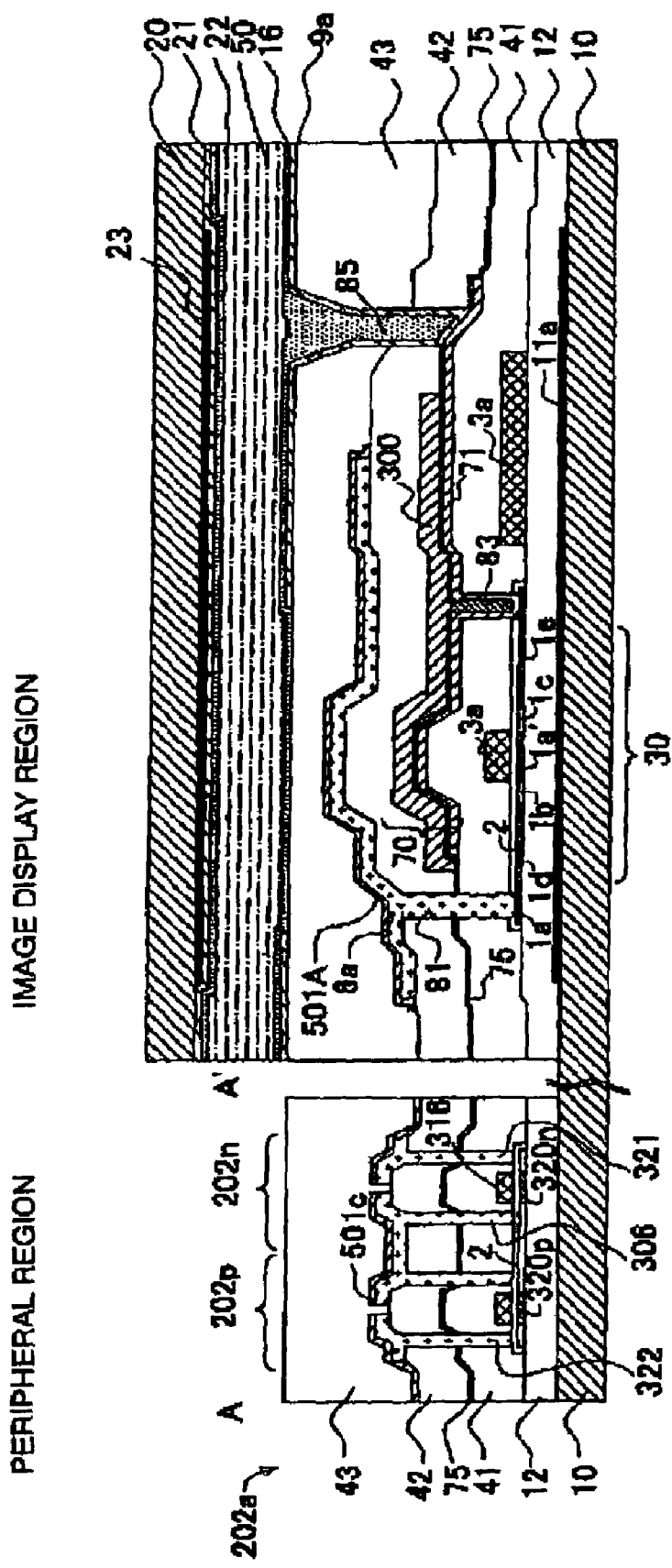
FIG. 12 is a cross-sectional view showing the structures of a complementary transistor and one pixel structure in an image display region, which correspond to those shown in FIGS. 6 and 8.
Figure 13:
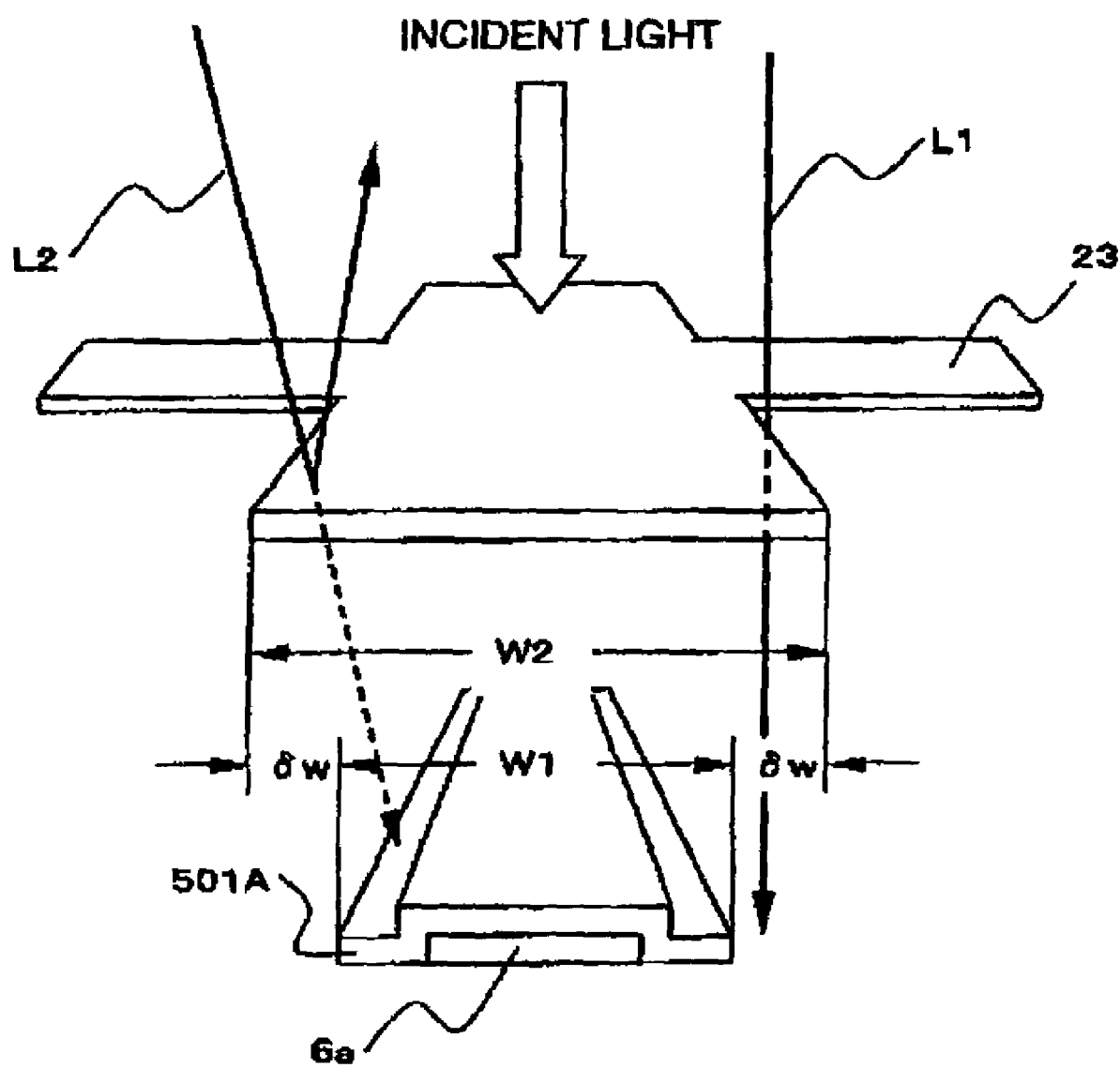
FIG. 13 is a schematic illustrating the positional relationship between the protective film and a lattice-shaped shading film according to the fourth embodiment.

Hereinafter, a fourth embodiment of the present invention is described with reference to FIGS. 11 to 13. The fourth embodiment related to a particular example in which protective films are formed so as to cover the data lines 6a formed in the image display region 10a, and the entire arrangement of the electrooptic device is equivalent to that in the first embodiment described above. FIG. 11 is a plan view showing a protective film 501c in the peripheral region and regions at which protective films 501A are formed so as to cover the data lines 6a, FIG. 12 is a cross-sectional view equivalent to those shown in the FIGS. 6 and 8 and shows the protective films 501c and 501A formed on the complementary TFT 202a and the data lines 6a, respectively. In addition, FIG. 13 is a plan view showing the positional relationship between a lattice-shaped shading film formed on the counter substrate and the protective film of the fourth embodiment. In FIGS. 11 to 13, the same reference numerals of the constituent elements of the first embodiment in FIGS. 1 to 6, the second embodiment in FIGS. 7 and 8, the third embodiment in FIGS. 9 and 10 designate the same constituent elements, and descriptions thereof are omitted.

In the fourth embodiment, in addition to the upper side of the complementary TFTs 202a in the peripheral region, as shown in FIGS. 11 and 12, the protective films 501A formed of a nitride film or the like are formed at the upper side of the data lines 6a formed in the image display region 10a. In particular, as shown in FIG. 12, the protective film 501A of the fourth embodiment and the protective film 501c in the peripheral region are formed of the same film. That is, in a manufacturing process of this electrooptic device, after a prefilm to form the protective films 501A and 501c is formed over the entire surface of the TFT array substrate 10, patterning is performed by photolithographic and etching steps so that the prefilm remains (that is, so as to have a shape as shown in FIG. 11) only on the data lines 6a and in the peripheral region, so that the protective films 501A and 501c are simultaneously formed. In addition, as shown in FIG. 12, the protective films 501A and 501c thus formed are provided so as to cover the upper side of the data lines 6a containing aluminum and the upper side of the various electrodes of the complementary TFTs 202a, which electrodes are formed of the same film as that for the data lines 6a and also contain aluminum.

Related to this, the protective films 501A and 501c formed in the same step as described above preferably have a thickness of approximately 5 to 35 nm. The reason for this is that when the thickness is less than 5 nm, an effect of preventing or reducing moisture penetration described later cannot be satisfactorily obtained, and when the thickness is more than 35 nm, highly colored light that passed through the protective film may be mixed with light displaying an image. In addition, in the fourth embodiment, although the third interlayer insulating film 43 made of BPSG is formed on the protective films 501A and 501c, and at the upper side of the third interlayer insulating film 43, the pixel electrodes 9a and the alignment film 16 are formed, when the thickness of the protective films 501A and 501c are controlled in the range described above, steps formed on the surface of the third interlayer insulating film 43 or those on the surface of the alignment film 16 can be controlled not to be too large.

On the other hand, the protective film 501A of the present invention has the relationship as shown in FIG. 13 with a lattice-shaped shading film 23 formed on the counter substrate 20. In FIG. 13, since it is intended to show the positional relationship therebetween, only the protective film 501A, the lattice-shaped shading film 23, and the data line 6a are shown. First, in the fourth embodiment, on the counter substrate 20, in more particular, between the substrate 20 and the counter electrode 21, the lattice-shaped shading film 23 in plan view to define the non-opening regions are formed (also see FIG. 12). This lattice-shaped shading film 23 may be formed, for example, of aluminum having relatively high light reflecting ability. According to this structure, since light incident on the counter substrate 20, which comes from the upper side in FIG. 13, is reflected, the incident light can be prevented or substantially prevented from excessively entering the inside of the electrooptic device. In addition to the aluminum mentioned above, the lattice-shaped shading film 23 may be formed, for example, of chromium having relatively high light absorbing ability, an alloy thereof, or resin black, and may have the laminate structure formed of materials having light reflecting ability and light absorbing ability. Furthermore, instead of "a lattice pattern", a striped pattern may be formed.

In particular in the fourth embodiment, width W2 of the shading film 23 along the data line 6a is formed to be larger than width W1 of the protective film 501A as shown in FIG. 13. In particular, the distance from the edge of the protective film 501A to that of the lattice-shaped shading film 23 is preferably set to approximately 0.2 to 1.0 µm, that is, δw=(W2−W1)/2=0.2 to 1.0 (µm) is preferably satisfied. Accordingly, the protective film 501A of the fourth embodiment is substantially formed in the non-opening regions.

In addition, in the electrooptic device of this embodiment, as described in the above first embodiment, the capacitance line 300 forming a part of the laminate structure provided on the TFT array substrate 10 also has a function as a shading layer to shade the TFT 30 from incident light at the upper side of the TFT 30. That is, the capacitance line 300 in this case serves as an embedded shading film. In addition, in the electrooptic device of this embodiment, the lower side shading film 11a constituting a part of the laminate structure described above also has a function to shade the TFT 30 from returned light or the like at the lower side of the TFT 30. That is, the lower side shading film 11a also serves as an embedded shading film.

In addition, in the case described above, the conditions may also be satisfied in which width W1 of the protective film 501A is smaller than that of the capacitance line 300 or that of the lower side shading film 11a. For example, concerning the relationship between the protective film 501A and the capacitance line 300, the width of a protruding portion (the protruding portion is a portion overlapping the protective film 501 A) of the capacitance line 300 is larger than that of the protective film 501A, and concerning the relationship between the protective film 501A and the lower side shading film 11a, the width of the lower side shading film 11a along the data line 6a is larger than that of the protective film 501A. That is, the "shading film" of the present invention includes the lattice-shaped shading film 23 formed on the counter substrate 20, as described above, and also includes the embedded shading films made of the capacitance line 300, the lower side shading film 11a, and the like. As a result, when the conditions described above are satisfied, the protective films 501A can also be disposed substantially in the non-opening regions as same as that described above.

By the arrangement described above, according to the electrooptic device of the fourth embodiment, the following operational effects can be obtained. First, since the protective film 501A is formed so as to cover the data line 6a, for example, the case can be avoided in which some damage is done to the data lines 6a in a process for manufacturing the electrooptic device. As a result, the probability of the generation of defects, such as corrosion or disconnections of the data lines 6a is decreased, and hence accurate performance of the electrooptic device can be expected.

In particular, the operational effect described above can be more efficiently obtained when the protective films 501A and 501c are nitride films formed by a plasma CVD method or the like. The reason for this is that since a nitride film has a relatively dense structure and superior stability, processing therefor, more particularly, etching or the like for patterning is difficult to perform. That is, on the contrary, in order to process the nitride film, it means that a relatively strong etching method must be used, and as a result, the probability in which damage done to the data lines 6a located under the nitride films is increased. The problem described above becomes more serious when the data lines 6a or the like are formed, for example, of aluminum.

Accordingly, in the fourth embodiment, since the protective films 501A and 501c are formed so as to cover the data lines 6a and various electrodes of the complementary TFTs 202a, even when the protective films 501A and 501c are each made of a nitride film, relatively strong etching and the like may not adversely affect the data lines 6a and the various electrodes which are located at the lower layer side. That is, damage is not done to the data lines 6a or the various electrodes of the complementary TFTs 202a by etching described above, and more particularly, corrosion, disconnections, and the like do not substantially occur.

In addition, in the fourth embodiment, compared to the case in which the protective film 501 is formed only in the peripheral region as in the first embodiment described above, the total area of the protective film 501c and the protective films 501A of the fourth embodiment is apparently large when FIGS. 11 and 2 are compared with each other. Hence, the effect of preventing or reducing moisture penetration can be efficiently obtained, and the life of the device can be further increased. In practice, in the case in which the protective films 501A and 501c are formed as shown in FIG. 11, it was confirmed that the device life of the electrooptic device can be increased by approximately five times that of a conventional device.

In addition, in the image display region 10a, since the protective films 501A are formed to cover only the data lines 6a, problems in that an image is darkened or slightly colored light is mixed with a display image may hardly arise. Related to this, in particular in the fourth embodiment, since width W1 of the protective film 501A is formed smaller than width W2 of the lattice-shaped shading film 23, the probability in which a slightly colored light is mixed with a display image is decreased to extremely low. That is, since incident light shown in FIG. 13 passes through outside the lattice-shaped shading film 23 in principle (see light L1 in FIG. 13), an absolute amount of light passing through the protective film 501A is extremely decreased. Furthermore, the case in which light having an oblique component exceptionally passes through the protective film 501A while passing through outside of the lattice-shaped shading film 23 may be considered. However, in the fourth embodiment, since δw=(W2−W1)/2=0.5 to 1.0 μm is preferably satisfied as described above, the probability described above is also extremely low (see light L2 in FIG. 13). The reason for this is that a so-called "portion creating shadow" of the lattice-shaped shading film 23 becomes larger.

As described above, in the fourth embodiment, the probability of degrading the image quality is significantly decreased. By a width difference of 0.05 to 1.0 μm described above, the operational effects described above can be obtained, and in addition, since the lattice-shaped shading film 23 does not unnecessarily decrease the opening region, a sufficient amount of transmitted light can be secured, and a brighter image can be displayed. Accordingly, the width difference mentioned above is also preferable by the above reasons.

In addition, since the protective films 501c and 501A of the fourth embodiment are formed at the lower side of the third interlayer insulating film 43 made of a BPSG film, the following operational effects can be obtained. First, owing to a low-temperature processability at 400° C. or less or flexibility of the BPSG film, even when the data lines 6a are formed of aluminum, the interlayer insulating film can be suitably formed on the data lines 6a while aluminum is not fused, and since the shapes of the data lines 6a are not transferred onto the surface of the interlayer insulating film, the probability in which unnecessary steps are formed on the surface can be decreased. According to the latter operational effect, since the formation of unnecessary steps can be avoided even on the surface of the alignment film 16 formed on the upper side of the third interlayer insulating film 43, rubbing treatment can be preferably performed on the alignment film 16, and the orientation state of liquid crystal molecules, which form the liquid crystal layer 50 to be in contact with the alignment film 16, is not substantially disordered.

On the other hand, the BPSG film has an undesirable property, i.e., a high water absorbing ability, and due to this property, the case may occur in which water absorbed beforehand in the BPSG film reaches the TFT 30, and the life thereof is decreased thereby. However, in the fourth embodiment, as shown in FIG. 13, since the protective films 501A and 501c are formed at the lower side of the third interlayer insulating film 43, it is understood that a pass of water penetrating from the third interlayer insulating film 43 to the TFT 30 is effectively blocked. That is, the moisture resistance for the TFT 30 is further enhanced, and hence the device life of the electrooptic device of the fourth embodiment can be reliably increased.

In this embodiment, the protective films 501A are formed to cover only the data lines 6a in the image display region 10a; however, the protective film may be optionally formed to cover the scanning lines 3a in addition to the data lines 6a. In the case described above, a lattice-shaped protective film is formed so as to correspond to a lattice pattern formed by the data lines 6a and the scanning lines 3a. In addition, in this configuration described above, since the ratio of the protective film to the TFT array substrate 10 is relatively increased, it is believed that the operational effect of enhancing the moisture resistance for the TFT 30 is effectively obtained. In addition, when the lattice-shaped protective film is formed as described above, since the protective film does not reach the opening region as is the case described above, the case in which an image is darkened or a slightly colored light is mixed with a display image also does not substantially occur, and as a result, the case in which the image quality is degraded will not occur at all.

Modified Embodiment

In the second to fourth embodiments described above, in accordance with the presence of the TFTs, regions at which the protective film 501a, 501b, or 501c are to be formed are determined. However, as one modified embodiment, in a laminate structure on the TFT array substrate 10, for example, the protective film 501a, 501b, or 501c may not be provided partly in regions at which wires, electrodes, elements, and the like provided at the upper side of the protective film 501a, 501b, or 501c must be connected via contact holes to wires, electrodes, elements, and the like provided at the lower side of the protective film 501a, 501b, or 501c. Accordingly, a step of forming openings for contact holes becomes easier, and hence opening for contact holes or the like can be preferably performed in a limited non-opening region in each pixel.

In addition, in the first to the third embodiments described above, the protective film 501 or the like is not provided in the image display region 10a. As another modified embodiment, the protective film may be provided in the non-opening region of each pixel in the image display region 10a. According to this arrangement, since the protective film is not present in the opening region of each pixel at which light actually performing display passes therethrough or is reflected therefrom, a problem in that light transmittance is decreased or a display image is colored in a slight, particular color may not arise. In addition, in accordance with the formation of the protective film in the non-opening regions, the moisture resistance for the TFT 30 or the like can be enhanced to some extent in the image display region 10a. Related to this, this particular configuration is exactly the case described in the fourth embodiment.

Furthermore, in the first to the fourth embodiments described above, the formation of the protective film 501 or the like is determined by regions of the substrate; however, as another modified embodiment, in a region at which the protective film 501 or the like is not preferably formed or is not necessarily formed in the first to the fourth embodiments, a relatively thin protective film may be formed, and in a region at which the protective film 501 or the like is preferably formed, the protective film may be formed as in the cases described in the first to the fourth embodiments. According to this arrangement, effects equivalent to those of the first to the fourth embodiments can be obtained.

Furthermore, in the first to the fourth embodiments, as the pixel switching TFT 30, an optional TFT, such as an N-channel transistor, a P-channel transistor, or a complementary TFT formed by combination of the above two, may be used. However, as another modified embodiment, in the first to the third embodiments, only N-channel transistors may be used as the pixel switching TFTs 30. When N-channel transistors, which are unlikely to degrade by moisture or water compared to P-channel transistors, are formed in the image display region 10a, even though the image display region 10a is not or is not substantially covered with the protective film 501 or the like because of preference of the display image quality, the structure having superior moisture resistance on the whole can be obtained.

In the embodiments described with reference to FIGS. 1 to 13, instead of providing the data line drive circuit 101 or the scanning line drive circuit 104 on the TFT array substrate 10, for example, they may be electrically and mechanically connected to a drive LSI mounted on a TAB (Tape Automated bonding) substrate via an anisotropic conductive film provided at the peripheral portion of the TFT array substrate 10. In addition, at each of the side of the counter substrate 20 on which light is incident and the side of the TFT array substrate 10 from which light is emitted, for example, in accordance with an operation mode, such as a TN (Twisted Nematic) mode, a VA (Vertically Aligned) mode, or a PDLC (Polymer Dispersed Liquid Crystal) mode, or a normally white mode/normally black mode, there are provided a polarizing film, a retardation film, a polarizer, or the like in a predetermined direction.

Since the electrooptic devices of the embodiments described above are each applied to a projector, three electrooptic devices are used as RGB light valves, and respective colors separated through a dichroic mirror for RGB separation are incident on the light valves as projection light. Accordingly, in these embodiments, color filters are not provided on the counter substrate 20. However, on predetermined regions of the counter substrate 20 opposing the pixel electrodes 9a, RGB color filters may be provided together with a protective film therefor. According to the arrangement described above, to direct viewing or reflection type color electrooptic apparatuses in addition to projectors, the electrooptic device of each embodiment described above may be applied. In addition, microlenses may be formed on the TFT array substrate 10 so as to correspond to individual pixels. Alternatively, a color filter layer made of color resists or the like may be provided under the pixel electrodes 9a, which oppose to RGB, on the TFT array substrate 10. According to the arrangement described above, the condensing efficiency of incident light is enhanced, thereby realizing an electrooptic device which performs bright display. Furthermore, by depositing a plurality of interference layers having different refractive indexes on the counter substrate 20, a dichroic filter forming RGB colors may be formed using optical interference. When a counter substrate 20 provided with this dichroic filter is used, a color electrooptic device which performs brighter display can be realized.

Manufacturing Process

Figure 14:
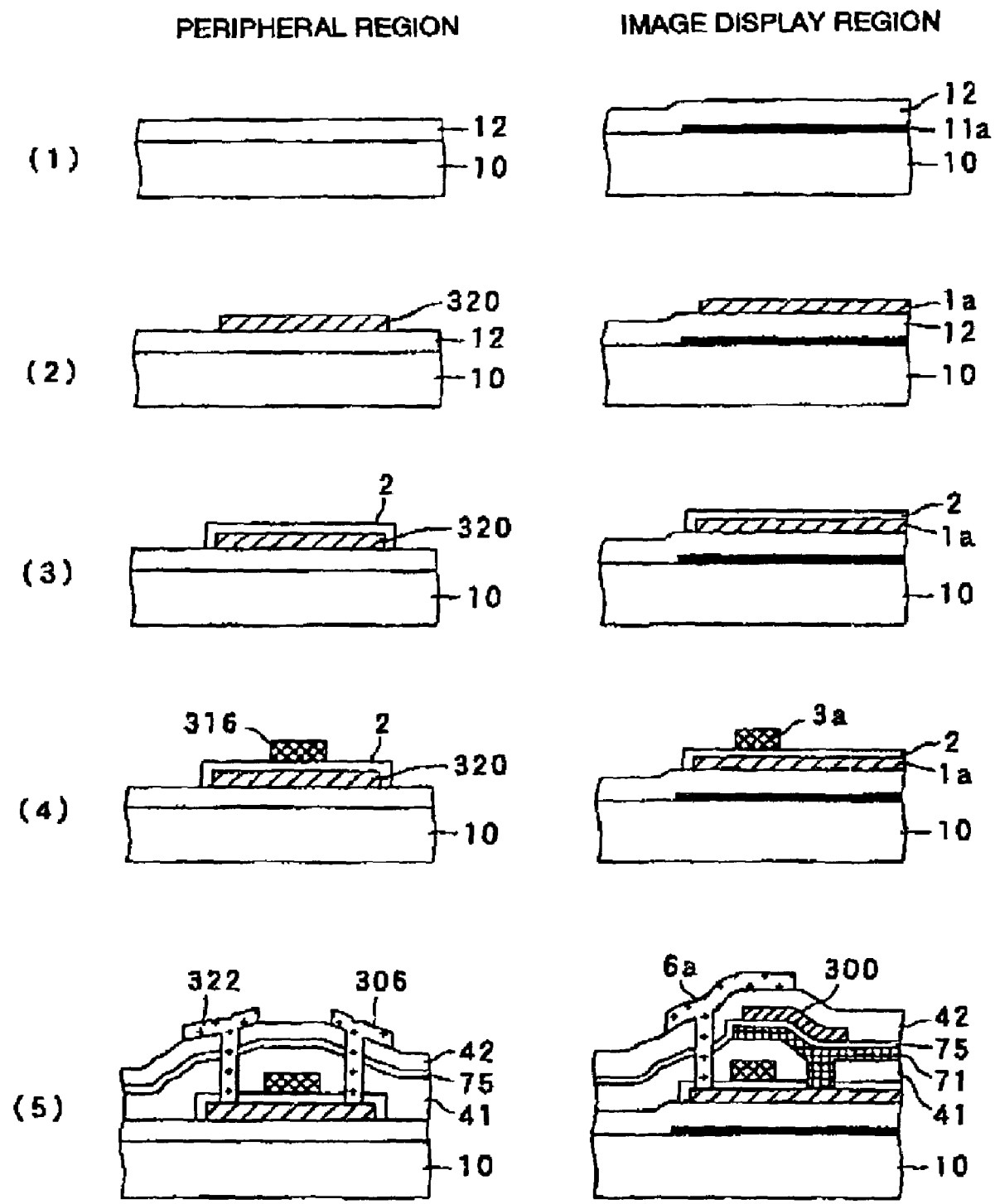
FIGS. 14(1)–14(5) are schematics showing manufacturing steps (part 1) in which cross-sectional views of an area at which a TFT is formed in a peripheral region are shown at the left side, and cross-sectional views of an area at which a TFT is formed in an image display region are shown at the right side.

Next, a method for manufacturing an electrooptic device having the above structure will be described with reference to FIGS. 14(1) to 16(8'). FIGS. 14(1)–15(8) illustrate steps of the manufacturing method, and in these figures, the cross-sectional structure of an area at which a TFT is formed in the peripheral region in each step is shown at the left side, and the cross-sectional structure of an area at which a TFT is formed in the image display region in each step is shown at the right side. In addition, FIGS. 16(6)–16(8') illustrate steps of a manufacturing method according to a modified embodiment.

First, in step (1) in FIG. 14, the TFT array substrate 10, such as a silicon substrate, quartz substrate, or glass substrate, is prepared. Heat treatment is performed preferably in an inert gas atmosphere of nitrogen ($N_2$) or the like at approximately 850 to 1300° C., or more preferably, at a high temperature of 1,000° C. or more, so that the TFT array substrate 10 will not be distorted in a high temperature process which will be subsequently performed.

Over the entire surface of the TFT array substrate 10 thus treated, by sputtering a metal such as Ti, Cr, W, Ta, or Mo, or a metal alloy such as a metal silicide, a shading layer having a thickness of approximately 100 to 500 nm, and preferably, approximately 200 nm is formed, and subsequently, the lower side shading film 11a having a pattern as shown in FIGS. 5 and 6 is formed on the TFT array substrate 10 by photolithography and etching. Next, on the lower side shading film 11a, the underlayer insulating film 12 made of a silicate glass, such as NSG, PSG, BSG, or BPSG; a silicon nitride film; or a silicon oxide film is formed, for example, by an atmospheric or reduced-pressure CVD method using a TEOS (Tetraethoxysilane) gas, TEB (Tetraethyl borate) gas, or TMOP (Tetramethyloxy phosphate) gas.

Next, as shown in step (2), on the underlayer insulating film 12, an amorphous silicon film is formed by reduced-pressure CVD or the like and is then processed by heat treatment, so that a polysilicon film can be obtained by solid-phase growth. Alternatively, without forming an amorphous silicon film, a polysilicon film is directly formed by a reduced-pressure CVD method or the like. Next, on this polysilicon film, a photolithographic step, an etching step, and the like are performed, so that the semiconductor layer 1a is formed having a predetermined pattern shown in FIGS. 5 and 6 in the image display region. At the same time, the semiconductor layer 320 is formed having a predetermined pattern shown in FIG. 7 or FIG. 9 in the peripheral region.

Next, as shown in step (3), thermal oxidation or the like is performed, thereby forming the insulating film 2 which is to be formed into gate insulating films. As a result, the thicknesses of the semiconductor layer 1a and the semiconductor layer 320 are each approximately 30 to 150 nm, or more preferably, approximately 35 to 50 nm, and the thickness of the insulating film 2 is approximately 20 to 150 nm, or more preferably, approximately 30 to 100 nm.

Next, as shown in step (4), a polysilicon film doped with P (phosphor) having a thickness of approximately 100 to 500 nm is formed by deposition using a reduced-pressure CVD method or the like, and a photolithographic step, an etching step, and the like are then performed, thereby forming the scanning lines 3a having a predetermined pattern shown in FIGS. 5 and 6 in the image display region. At the same time, the gate electrodes 316 having a predetermined pattern shown in FIGS. 7 to 10 are formed in the peripheral region. Subsequently, by performing two doping steps to provide lightly doping and heavily doping, the semiconductor layers 1a to provide the pixel switching TFTs 30 are formed in the image display region, each having the LDD structure in which the lightly doped source region 1b, lightly doped drain region 1c, heavily doped source region 1d, and heavily doped drain region 1e are formed, and at the same time, the semiconductor layers 320, each including a P-channel region 320p and an N-channel region 320n, which form the TFT 202 or the like, are formed in the peripheral region.

Next, as shown in step (5), for example, by an atmospheric or reduced-pressure CVD method using a TEOS gas or the like, the first interlayer insulating film 41 made of a silicate glass film, such as NSG, PSG, BSG, or BPSG; a silicon nitride film; a silicon oxide film, or the like is formed.

Subsequently, by a reduced-pressure CVD method or the like, a polysilicon film doped with P (phosphor) is deposited to form the relay layer 71. After the dielectric film 75 having a relatively small thickness of approximately 50 nm is formed, which is made of a high-temperature silicon oxide film (HTO film) or a silicon nitride film by a reduced-pressure method, a plasma display CVD method, or the like, a metal, such as Ti, Cr, W, Ta, or Mo, or a metal alloy, such as a metal silicide is sputtered, thereby forming the capacitance lines 300. Accordingly, the storage capacitances 70 are formed in the image display region.

Next, for example, by an atmospheric or reduced-pressure CVD method using a TEOS gas or the like, the second interlayer insulating film 42 made of a silicate glass film, such as NSG, PSG, BSG, or BPSG; a silicon nitride film; a silicon oxide film, or the like is formed. Subsequently, after contact holes are formed by dry etching, such as reactive ion etching or reactive ion beam etching, performed for the second interlayer insulating film 42, a metal film made of a low resistance metal, such as aluminum having shading properties or a metal silicide is deposited on the entire surface of the second interlayer insulating film 42 so as to have a thickness of approximately 100 to 500 nm thick, or more preferably, approximately 300 nm thick. Next, by photolithography and etching, the data lines 6a having a predetermined pattern is formed in the image display region. At the same time, in the peripheral region, the wires 322 and 306 are formed.

Figure 15:
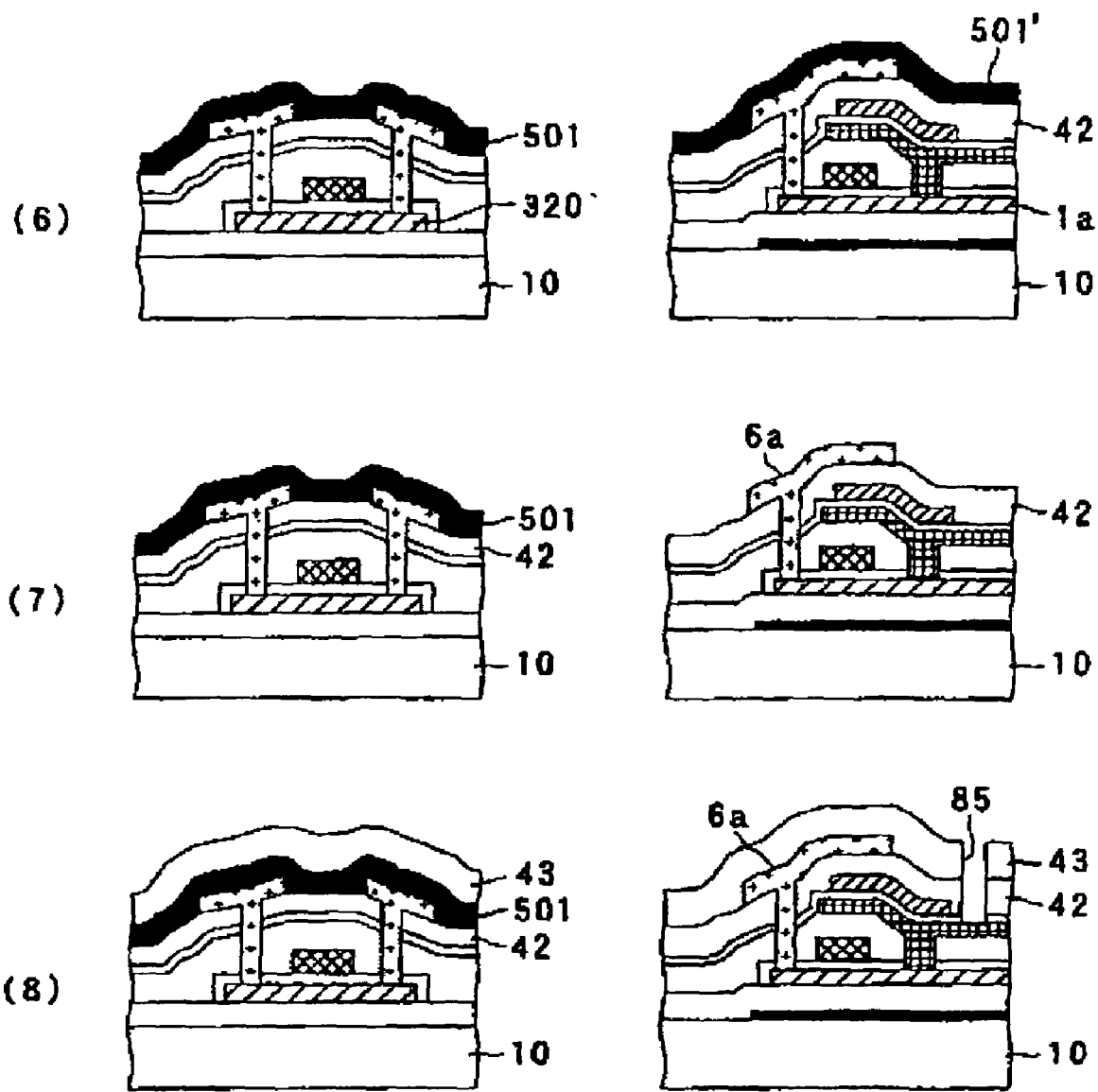
FIGS. 15(6)–15(8) are schematics showing manufacturing steps (part 2) in which cross-sectional views of an area at which a TFT is formed in a peripheral region are shown at the left side, and cross-sectional views of an area at which a TFT is formed in an image display region are shown at the right side.

Next, in step (6) in FIG. 15, by low-temperature CVD, plasma CVD, or the like, the protective film 501 made of a nitride film or the like is formed over the entire TFT array substrate 10 so as to cover the data lines 6a and the second interlayer insulating film 42. That is, in step (6) described above, over the entire image display region, a protective film 501' is formed.

Next, in step (7), by removing the protective film 501' formed in the image display region using photolithography and etching, the protective film 501 is formed only in the peripheral region.

Subsequently, by performing dry etching, such as reactive ion etching or reactive ion beam etching, for the third interlayer insulating film 43, the contact hole 85 is formed therein.

In particular in this step, since the contact hole 85 is formed in the region at which the protective film 501', which is made of a nitride film or the like and is not easily etched because of its protection characteristics, is removed in step (7), the etching therefor is relatively easy. If the protective film 501' is not removed in step (7), when the contact hole 85 is formed, an etchant may penetrate the interface with the protective film 501', and as a result, the size of the contact hole 85 is unevenly enlarged, or a minute void which cause separation of layers may grow.

Subsequently, after a transparent conductive film made of an ITO film or the like and having a thickness of approximately 50 to 200 nm is formed on the third interlayer insulating film 43 by deposition using sputtering, the pixel electrodes 9a are formed by photolithography and etching, and on the surfaces thereof, a polyimide-based coating solution to form an alignment film is applied and is then processed by rubbing treatment in a predetermined direction so as to have a predetermined pretilt angle, thereby forming the alignment film 16.

According to the manufacturing process described above, as in the above first to the third embodiments, an electrooptic device can be easily manufactured having the structure in which the TFTs are formed both in the image display region and in the peripheral region, and in addition, in which the TFTs only in the peripheral region are covered with the protective film 501 or the like.

Figure 16:
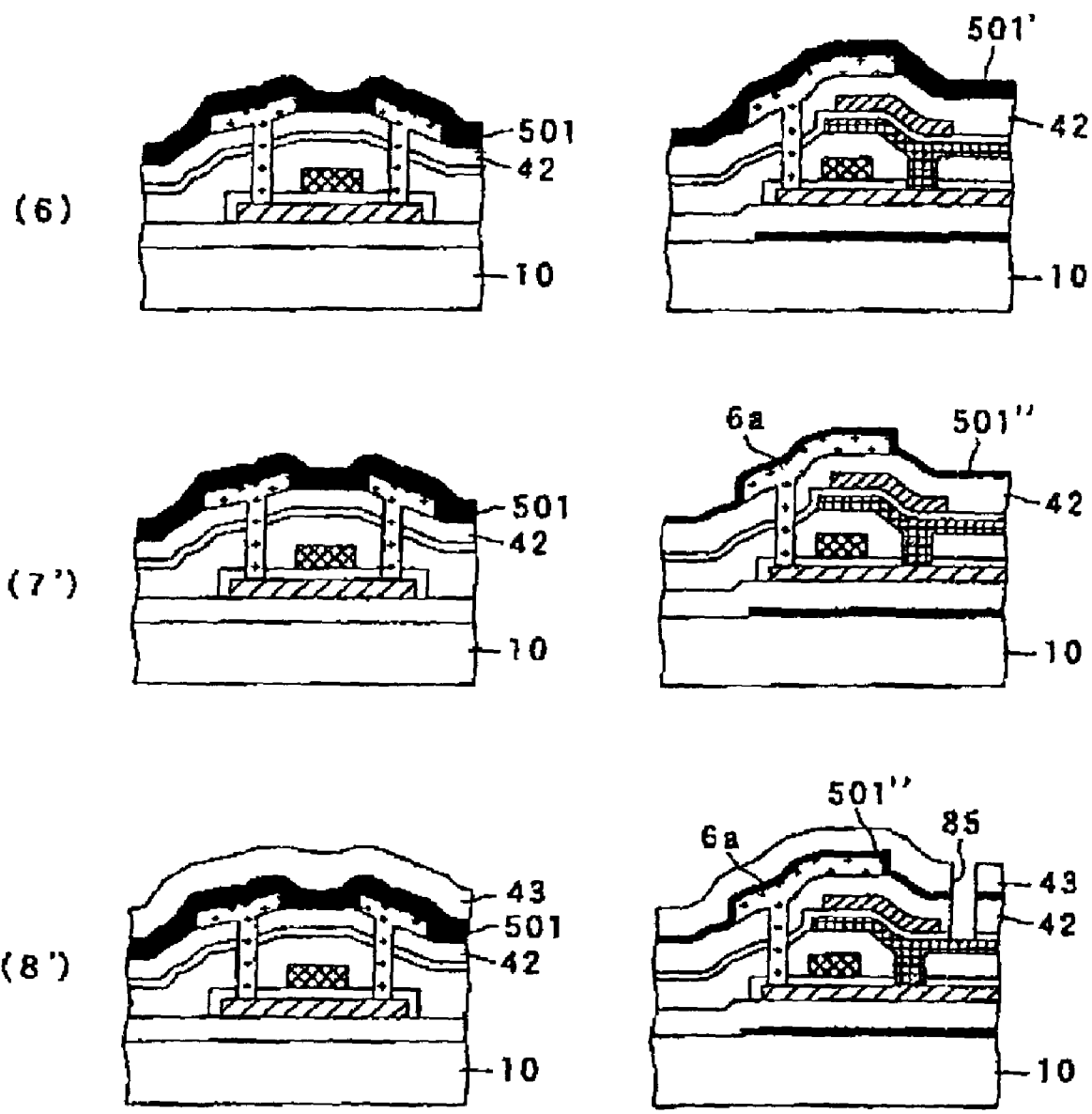
FIGS. 16(6)–16(8') are schematics showing manufacturing steps according to a modified embodiment.

In addition, as shown in FIG. 16, instead of step (7) described above, the protective film 501' formed in the image display region 10a is not totally removed by etching, and step (7') in which etching is performed to decrease the thickness of the protective film 501' may be performed. In this case, in step (8') shown in FIG. 16, opening operation for the contact hole 85, i.e., operation to form an penetrating hole in the protective film 501' made of a dense nitride film or the like, is performed. However, when the protective film 501' is appropriately etched beforehand to form a protective film 501" having a small thickness, the opening operation for the contact holes 85 becomes relatively easy. Hence, since the protective film 501" having a small thickness is formed in the image display region 10a, the moisture resistance in the image display region 10a can be enhanced thereby. At the same time, since the protective film 501" having a small thickness is formed, actual problems of decrease in light transmittance, display image colored in a slight, particular color, and the like can be substantially suppressed, and hence practical advantages can be obtained.

In addition, step (7') or step (8') in FIG. 16 described above is mainly focused on the formation of the thin protective film, and in the fourth embodiment, the step of remaining the protective films 501A so as to cover the data lines 6a is a key step. However, it is naturally understood that the manufacturing steps described above are approximately equivalent to each other. However, in the fourth embodiment, in a manner different from that in step (7') or step (8') shown in FIG. 16, the protective film is not formed to cover the entire surface of the second interlayer insulating film 42, and patterning should be performed in order to form the protective films 501A only on the data lines 6a (see FIGS. 11 and 12) as shown in FIG. 13. In the case described above, a step of thinning the protective films 501 A may be or may not be performed.

Embodiment of Electronic Apparatus

Figure 17:
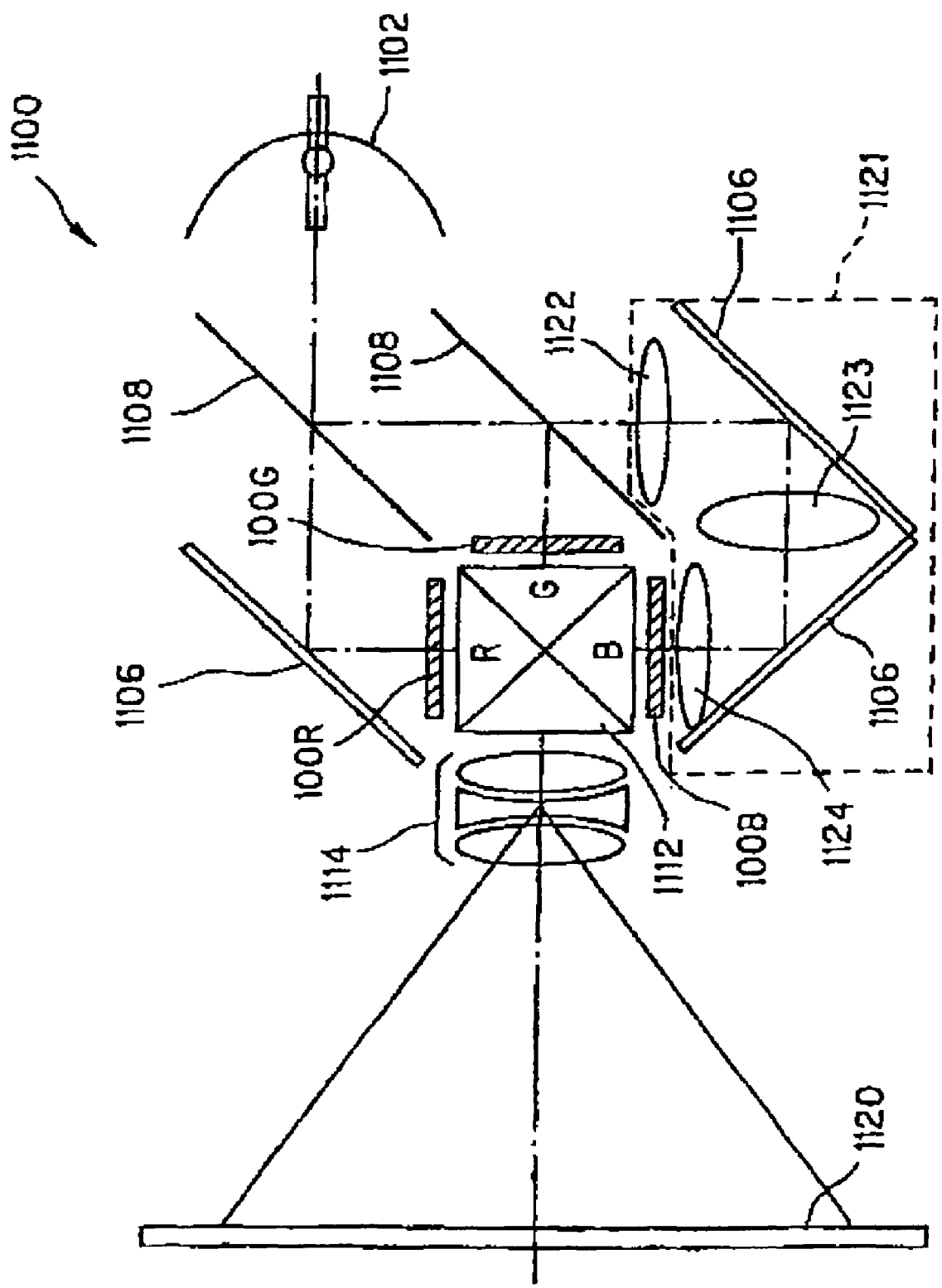
FIG. 17 is a schematic cross-sectional view of a color liquid crystal projector as an example of a projection color display device according to an embodiment of an electronic apparatus of the present invention.

Next, concerning an embodiment of a projection color display device, which is as an example of an electronic apparatus, using the electrooptic device described above as a light valve, the entire arrangement, and more particularly, the optical arrangement will be described. FIG. 17 is a schematic cross-sectional view of a projection color display device.

As shown in FIG. 17, a liquid crystal projector 1100, which is an example of a color display projector of this embodiment, includes three liquid crystal modules, each containing a liquid crystal device in which drive circuits are mounted on a TFT array substrate, these modules being used as light valves 100R, 100G, and 100B for RGB display and forming the projector. In the liquid crystal projector 1100, when projection light is emitted from a lamp unit 1102 of a white light source such as a metal halide lamp, the light is separated into light components R, G, and B corresponding to three primary colors R, G, and B by three mirrors 1106 and two dichroic mirrors 1108, and each light component is guided to the corresponding light valve 100R, 100G, or 100B. In the step described above, in order to suppress or reduce light loss caused by a long light pass, light B is particularly guided via a relay lens system 1121 formed of an incident lens 1122, a relay lens 1123, and an emission lens 1124. Subsequently, the light components modulated by the light valves 100R, 100G, and 100B, which correspond to the three primary colors, are again synthesized by a dichroic prism 1112 and are then projected to a screen 1120 as a color image via a projection lens 1114.

In addition to devices using liquid crystal, the electrooptic device of the present invention may be applied to electrophoretic devices, EL devices, and the like.

The present invention is not limited to the embodiments described above and may be optionally modified without departing from the spirit and the scope of the present invention. Accordingly, electrooptic devices, manufacturing methods therefor, and electronic apparatuses, which are modified in a manner as described above, are also within the technical scope of the present invention.

What is claimed is:

1. An electrooptic device, comprising:
 a substrate including an image display region and a peripheral region outboard of the image display region;
 display electrodes being pixel electrodes and disposed in the image display region above the substrate, the display electrodes having light transparency;
 electronic elements disposed in the peripheral region and including a peripheral circuit;
 a silicon nitride film formed to cover at least a part of the peripheral region; and
 first transistors disposed in the image display region, and electrically connected to the pixel electrodes,
 the silicon nitride film being provided under the display electrodes and not being provided in an entire opening region of each pixel in the image display region and being provided in a region of shading film of the each pixel in the image display and being provided only in a striped shape region along data lines in the image display region, the silicon nitride film being in direct contact with upper and side surfaces of the data lines without any interlayer between the silicon nitride film and the data lines, and
 the pixel electrodes and the first transistors being electrically connected to each other via contact holes, which are formed in a region at which the silicon nitride film is not formed so that the silicon nitride film is not existent on a side face of the contact holes.

* * * * *